(12) United States Patent
Dilluvio et al.

(10) Patent No.: US 8,025,328 B2
(45) Date of Patent: Sep. 27, 2011

(54) AUTOMOTIVE VEHICLE CONVERTIBLE ROOF SYSTEM

(75) Inventors: Christopher J. Dilluvio, Farmington Hills, MI (US); Bradley R. Garska, Saline, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 359 days.

(21) Appl. No.: 12/044,539

(22) Filed: Mar. 7, 2008

(65) Prior Publication Data

US 2009/0224568 A1 Sep. 10, 2009

(51) Int. Cl.
B60J 7/20 (2006.01)

(52) U.S. Cl. .......................... 296/109; 296/116

(58) Field of Classification Search ............... 296/107.9, 296/107.8, 116, 117; B60J 7/20
See application file for complete search history.

(56) References Cited

U.S. PATENT DOCUMENTS

| | | |
|---|---|---|
| 1,294,148 A | 2/1919 | Oliver |
| 1,426,129 A | 8/1922 | Velo |
| 1,463,193 A | 7/1923 | Botella |
| 2,193,091 A | 3/1940 | Fish |
| 2,267,471 A | 12/1941 | Keller |
| 2,592,512 A | 4/1952 | Fodermaier, Jr. |
| 2,768,857 A | 10/1956 | Albrecht |
| 2,794,672 A | 6/1957 | Burzi |
| 3,002,785 A | 10/1961 | Larché |
| 3,159,422 A | 12/1964 | Lautenbach |
| 3,473,842 A | 10/1969 | Bracey et al. |
| 3,536,354 A | 10/1970 | Ingram |
| 4,573,732 A | 3/1986 | Muscat |
| 4,711,485 A | 12/1987 | Maebayashi et al. |
| 4,720,133 A | 1/1988 | Alexander et al. |
| 4,720,134 A | 1/1988 | Seifert |
| 4,741,571 A | 5/1988 | Godette |

(Continued)

FOREIGN PATENT DOCUMENTS

FR 459931 11/1913

(Continued)

OTHER PUBLICATIONS 9 color photographs of a convertible roof mechanism believed to have been used on Cadillac Eldorado Convertibles for the 1971-1976 model years.

(Continued)

*Primary Examiner* — Glenn Dayoan
*Assistant Examiner* — Pinel Romain
(74) *Attorney, Agent, or Firm* — Harness, Dickey & Pierce, P.L.C.

(57) ABSTRACT

A soft-top convertible roof can extend and retract in a two-phase process. The first phase can correspond to a front portion of the top stack mechanism moving from a first raised position to a second retracted position and can be driven by an actuator which can be disposed in a roof rail forward of a rearmost roof rail. The second phase can correspond to the rear portion of the top stack mechanism moving from a raised position to a stowed position along with the front portion. The rearmost roof rail can remain stationary during the first phase. A connecting link can be connected to at least three roof rails that extend along a side of the vehicle and can be part of two four-bar linkage assemblies. A buggy link mechanism can drive retraction and extension of a backlite frame due to movement of the top stack mechanism.

33 Claims, 16 Drawing Sheets

U.S. PATENT DOCUMENTS

| | | |
|---|---|---|
| 4,778,215 A | 10/1988 | Ramaciotti |
| 4,784,428 A | 11/1988 | Moy et al. |
| 4,828,317 A | 5/1989 | Muscat |
| 4,840,419 A | 6/1989 | Kolb |
| 4,929,015 A | 5/1990 | Bauer |
| 4,958,882 A | 9/1990 | Kolb |
| 5,004,291 A | 4/1991 | Bauer et al. |
| 5,026,110 A | 6/1991 | Koop et al. |
| 5,033,789 A | 7/1991 | Hayashi et al. |
| 5,118,158 A | 6/1992 | Truskolaski |
| 5,209,544 A | 5/1993 | Benedetto et al. |
| 5,251,952 A | 10/1993 | Guckel et al. |
| 5,301,987 A | 4/1994 | Tokarz et al. |
| 5,427,429 A | 6/1995 | Piontek et al. |
| 5,429,409 A | 7/1995 | Corder et al. |
| 5,456,516 A | 10/1995 | Alexander et al. |
| 5,542,735 A | 8/1996 | Furst et al. |
| 5,593,202 A | 1/1997 | Corder et al. |
| 5,624,149 A | 4/1997 | Tokarz |
| 5,625,981 A | 5/1997 | Klein et al. |
| 5,678,881 A | 10/1997 | Tokarz |
| 5,685,596 A | 11/1997 | Tokarz et al. |
| 5,743,587 A | 4/1998 | Alexander et al. |
| 5,758,923 A | 6/1998 | Kolb |
| 5,765,904 A | 6/1998 | Aydt et al. |
| 5,769,483 A | 6/1998 | Danzl et al. |
| 5,779,299 A | 7/1998 | Purcell et al. |
| 5,785,375 A | 7/1998 | Alexander et al. |
| 5,810,422 A | 9/1998 | Corder et al. |
| 5,944,375 A | 8/1999 | Schenk et al. |
| 6,033,008 A | 3/2000 | Mattila |
| 6,042,174 A | 3/2000 | Durrani |
| 6,237,986 B1 | 5/2001 | Neubrand et al. |
| 6,318,793 B1 * | 11/2001 | Rapin et al. ............. 296/107.17 |
| 6,328,372 B1 | 12/2001 | Just |
| 6,390,531 B1 | 5/2002 | Schutt |
| 6,398,296 B1 | 6/2002 | Mayer et al. |
| 6,412,860 B1 | 7/2002 | Reinsch et al. |
| 6,416,111 B1 | 7/2002 | Neubrand |
| 6,416,121 B1 | 7/2002 | Miklosi |
| 6,419,295 B1 | 7/2002 | Neubrand |
| 6,428,090 B1 | 8/2002 | Reinsch et al. |
| 6,454,342 B2 | 9/2002 | Heselhaus et al. |
| 6,464,284 B2 | 10/2002 | Neubrand |
| 6,520,560 B2 | 2/2003 | Schutt et al. |
| 6,550,842 B1 | 4/2003 | Halbweiss et al. |
| 6,561,566 B2 | 5/2003 | Dintner et al. |
| 6,568,751 B2 | 5/2003 | Reinsch |
| 6,623,065 B2 | 9/2003 | Halbweiss et al. |
| 6,659,533 B1 * | 12/2003 | Grubbs .................... 296/107.07 |
| 6,666,494 B2 | 12/2003 | Antreich |
| 6,722,723 B2 | 4/2004 | Obendiek |
| 6,729,672 B2 | 5/2004 | Neubrand |
| 6,755,457 B2 * | 6/2004 | Grubbs .................... 296/107.09 |
| RE38,546 E | 7/2004 | Corder et al. |
| 6,793,267 B2 | 9/2004 | Hesselhaus |
| 6,796,595 B2 * | 9/2004 | Doncov .................. 296/107.09 |
| 6,802,554 B1 | 10/2004 | Just et al. |
| 6,863,333 B2 | 3/2005 | Heller et al. |
| 7,032,951 B2 | 4/2006 | Powell |
| 7,104,587 B2 | 9/2006 | MacNee, III et al. |
| 7,118,160 B2 | 10/2006 | Willard |
| 7,163,255 B2 | 1/2007 | Rawlings et al. |
| 7,658,008 B2 * | 2/2010 | Just et al. ..................... 29/897.2 |
| 7,740,302 B2 * | 6/2010 | Heselhaus .................... 296/116 |
| 2002/0125731 A1 | 9/2002 | Hasselgruber et al. |
| 2003/0038501 A1 | 2/2003 | Heselhaus |
| 2004/0232721 A1 | 11/2004 | Rawlings et al. |
| 2005/0140165 A1 | 6/2005 | Heller et al. |
| 2006/0043758 A1 * | 3/2006 | Powell .................... 296/107.08 |
| 2006/0061129 A1 | 3/2006 | Dilluvio |
| 2006/0097542 A1 | 5/2006 | Dilluvio |
| 2006/0131922 A1 * | 6/2006 | Russke ......................... 296/108 |
| 2006/0152033 A1 | 7/2006 | Schartner et al. |
| 2007/0194594 A1 * | 8/2007 | Heselhaus ................ 296/107.01 |
| 2007/0284909 A1 | 12/2007 | Dilluvio |
| 2008/0284200 A1 | 11/2008 | Dilluvio et al. |

FOREIGN PATENT DOCUMENTS

| | | |
|---|---|---|
| FR | 1382296 | 12/1964 |
| GB | 727661 | 4/1955 |
| WO | WO 2005084289 A2 * | 9/2005 |

OTHER PUBLICATIONS

"Dream Wheels, Toyota Lets Automotive Creativity Run Free at SEMA 2007," This Week From Toyota, AutoWeek, Advertisement Oct. 22, 2007.

"Drop-top Rolls", Nov. 22, 2004, AutoWeek, p. 4.

9 photographs of a convertible roof mechanism believed to have been used on Cadillac Eldorado Convertibles for the 1971-1976 model years.

MacKenzie, Angus, "Sunshine Superstar", May 2005, Motor Trend, pp. 74-78.

Vaughn, Mark, "Chrysler 300C Cabriolet", (Newport Convertible Engineering, Inc.), Nov. 22, 2004, AutoWeek, p. 4.

* cited by examiner

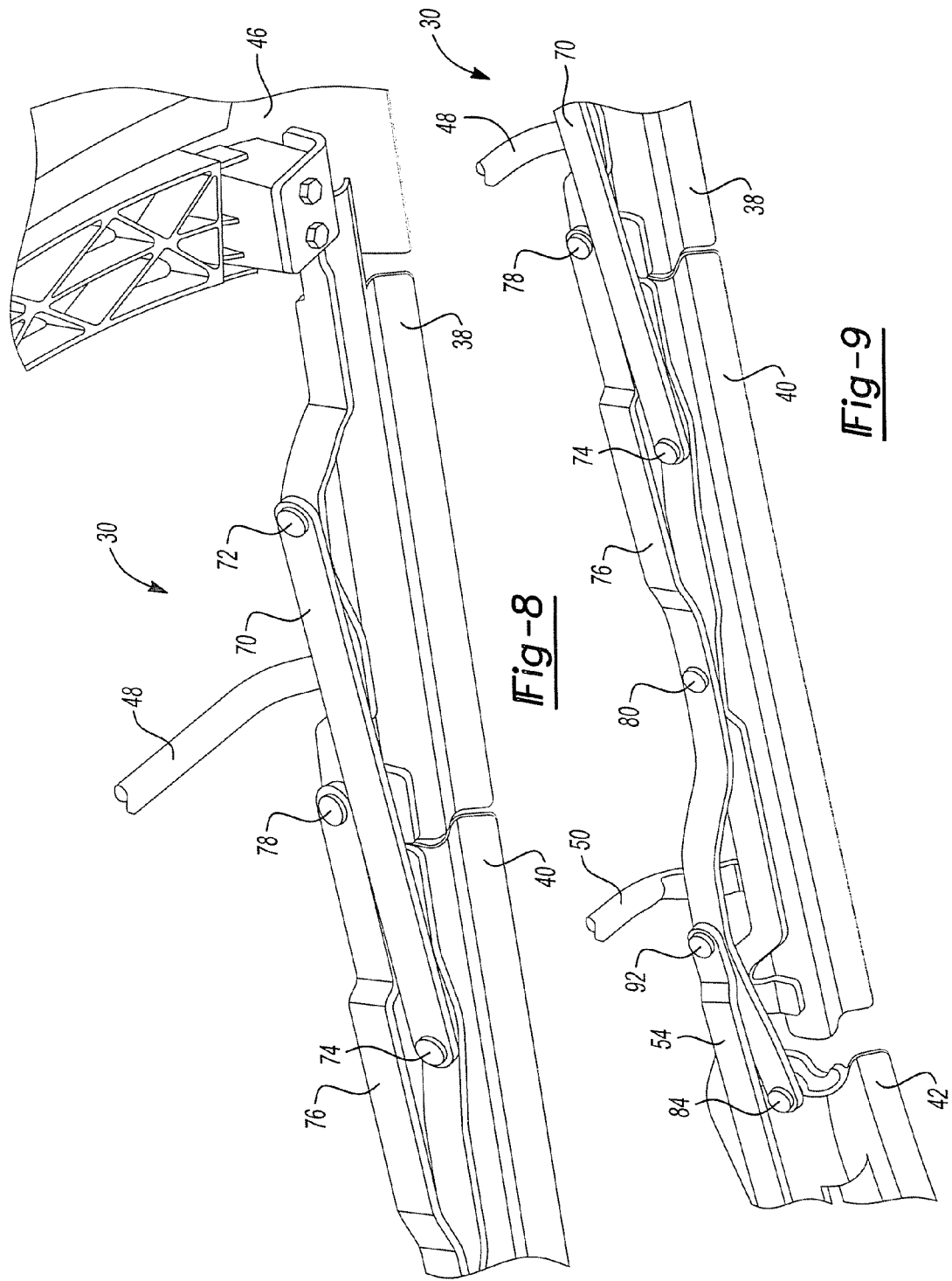

AUTOMOTIVE VEHICLE CONVERTIBLE ROOF SYSTEM

BACKGROUND AND SUMMARY

The present invention relates to convertible roofs and, more particularly, to convertible roofs having an extended length.

Traditional soft-top convertible roofs for automotive vehicles typically employ three, four, or five roof bows having an inverted U-shape spanning transversely across the vehicle for supporting a vinyl, canvas, or polyester fabric pliable roof cover. A plurality of roof rails typically extends along each side of the vehicle and move relative to one another to allow the convertible roof to be moved between a raised and stowed position. The roof bows typically are mounted to opposing roof rails and can move with the movement of the roof rails.

Most traditional convertible roofs are stowed in a boot well or stowage compartment that is located aft of a passenger compartment in the vehicle. A boot or tonneau cover can be used to cover the boot well and seal the convertible roof from view and/or protect the stowed roof from the environment. Optionally, a portion of the convertible roof can be visible when in the stowed position and provide a desired appearance for the vehicle.

Some vehicles are longer than others. The longer vehicles can present some difficulties when it is desired to utilize a convertible roof on such a vehicle. In particular, the longer vehicles may require the convertible roof to extend a longer fore-and-aft direction to enclose the passenger compartment. Additionally, in some types of vehicles, such as SUVs, the convertible roof can also be required to encompass the rear storage area of such a vehicle and may require a relatively vertical backlite. Such requirements can require the convertible roof to extend in a fore-and-aft direction a significant length.

Traditional convertible roofs with a soft top are typically driven entirely from a rear portion of the top stack mechanism. The long extension of the convertible roof in the fore-and-aft direction can present difficulties when trying to drive an entirety of the top stack mechanism at one time from a rear of the vehicle. That is, the excessive length can result in a convertible top that is cantilevered such a distance that it could be susceptible to buckling and/or be excessively heavy. Additionally, to drive such a long convertible roof can require an excessively large actuator or mechanism, thereby increasing the weight and the stowage space required to stow such as a convertible roof.

In accordance with the present teachings, a soft-top convertible roof is provided which extends and retracts in a two-phase process. During the retraction process, a front portion of the top stack mechanism can move from a first raised position to a second retracted position. Once in the second position, the rear portion of the top stack mechanism can move from a raised position to a stowed position along with the front portion.

In one aspect of the present teachings, the first phase of the two-step process can be driven by an actuator. The actuator can be disposed in a roof rail forward of a rearmost roof rail. The movement of the front portion of the convertible roof from the first position to the second position with the actuator can be accomplished while the rearmost roof rail remains stationary.

In another aspect of the present teachings, the top stack mechanism includes at least three roof rails that are coupled together along a side of the vehicle and move relative to one another during movement of the convertible between the raised and stowed positions. A connecting link can be connected to each of the at least three roof rails. In one aspect, the connecting link can be part of two different four-bar linkage assemblies that control the movement of the connected roof rails.

In yet another aspect of the present teachings, the backlite can be substantially vertical and can be contained within a frame. A buggy link mechanism can drive retraction and extension of the frame during movement of the soft-top convertible roof between the raised and stowed positions. A four-bar linkage can couple the frame to the vehicle.

The retraction of the soft-top convertible roof in the two-step process can advantageously reduce the stress on the top stack mechanism when moving between the convertible roof between the raised and stowed positions. The locating of actuators in the roof rails forward of the rearmost roof rail advantageously facilitates the two-step retraction process. Additionally, the location of the actuators can reduce the stress placed on the actuators moving the front portion of the top stack mechanism. The ability to connect at least three different roof rails with a single connecting link can advantageously reduce the number of links used to couple the roof rails together. The connecting link being part of two different four-bar linkage assemblies can facilitate the controlling and coordinating of the movement of the connected roof rails relative to one another. The use of a buggy link mechanism to drive retraction and extension of a backlite disposed in a frame in conjunction with a soft-top convertible roof can advantageously facilitate the coordination of the timing of the movement of the top stack mechanism and the backlite frame.

Additional objects, advantages, and features of the present invention will become apparent from the following description and the pending claims, taken in conjunction with the accompanying drawings. It should be understood that the detailed description and the specific examples are intended for purposes of illustration only and are not intended to limit the scope of the teachings.

DRAWINGS

The drawings described herein are for illustration purposes only and are not intended to limit the scope of the present disclosure in any way.

FIGS. 8-10 are fragmented perspective views of the top stack mechanism used in the convertible roof of FIG. 2 in the fully raised and operative position;

DETAILED DESCRIPTION

Figure 1:
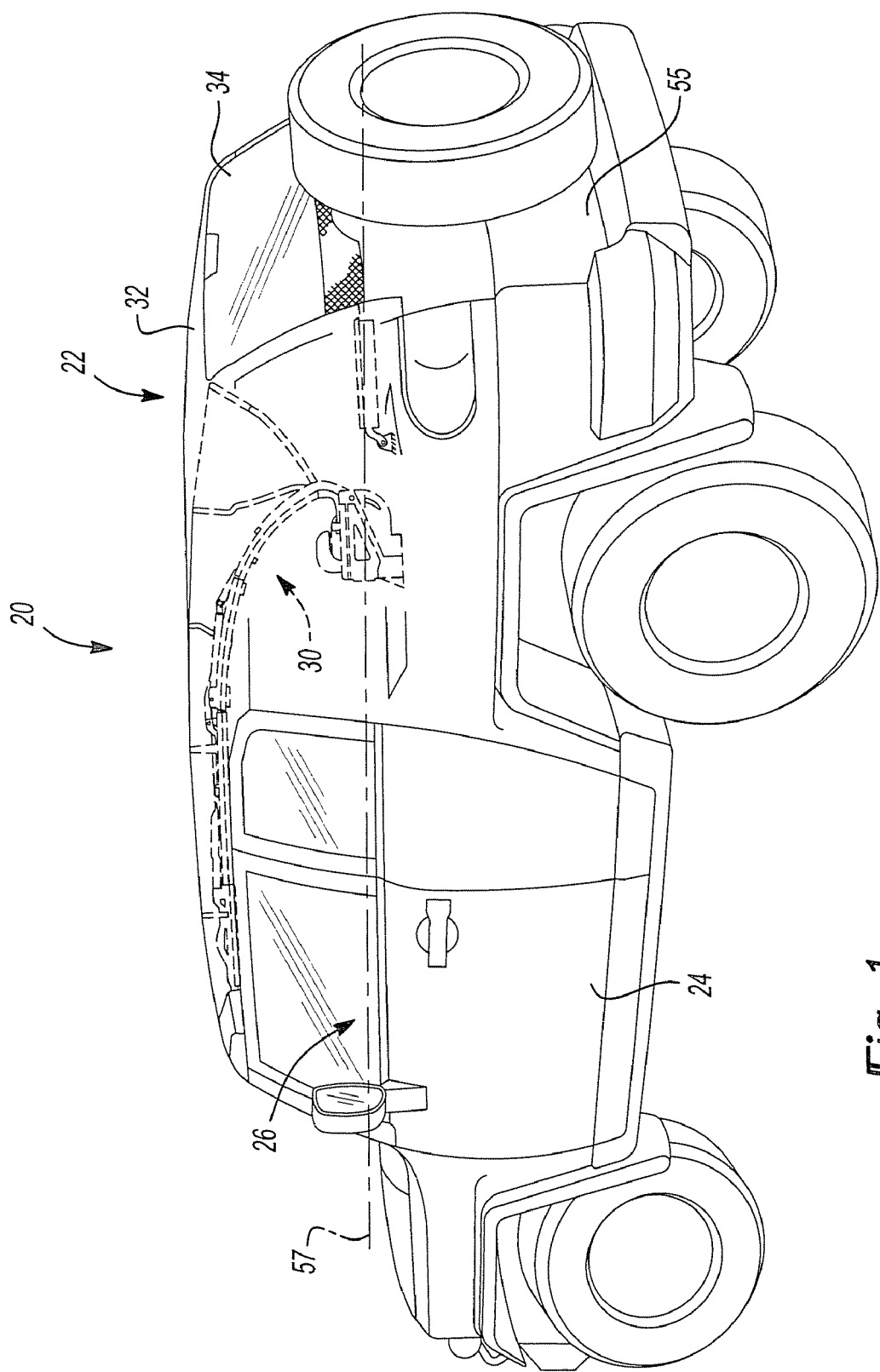
FIG. 1 is a perspective view of an SUV-type vehicle having a convertible roof according to the present teachings.

The following description is merely exemplary in nature and is not intended to limit the present disclosure, application, or uses. It should be understood that throughout the drawings, corresponding reference numerals indicate like or corresponding parts and features (e.g., 20, 120, 220, etc.).

In the figures, the convertible roof and the associated top stack mechanism are shown symmetrical about a longitudinal, fore-and-aft centerline (not shown) of the vehicle. The centerline, thus, also serves as a longitudinal centerline for the convertible roof and the top stack mechanism and its associated linkages and components. The top stack mechanism includes right and left roof linkages on the respective right and left sides of the vehicle. For brevity, at times only one side of the top stack mechanism and the convertible roof may be shown and/or discussed. However, it should be understood that the other side linkages are also provided as part of the top stack mechanism of the convertible roof and are mirrored images of the side depicted and/or discussed. Also, when using the terms "fore" and "aft", "front" and "back", and "forward" and "rearward" in describing the movement and components of the top stack mechanism and the convertible roof, such reference refers to the orientation of the components when the top stack mechanism and the convertible roof are in the fully raised operative position.

Referring to FIGS. 1-12, a vehicle 20 having a preferred embodiment of a convertible roof 22 according to the present teachings is shown. Vehicle 20 has a body 24 with a rear access door 55 and a passenger compartment 26. A storage area 28 is disposed aft of passenger compartment 26 and can receive convertible roof 22 when in the retracted position. Storage space 28 can thus serve as the storage space for the convertible roof or for other items. Storage space 28 can be accessed from a rear of vehicle 20 via door 55.

Figure 2:
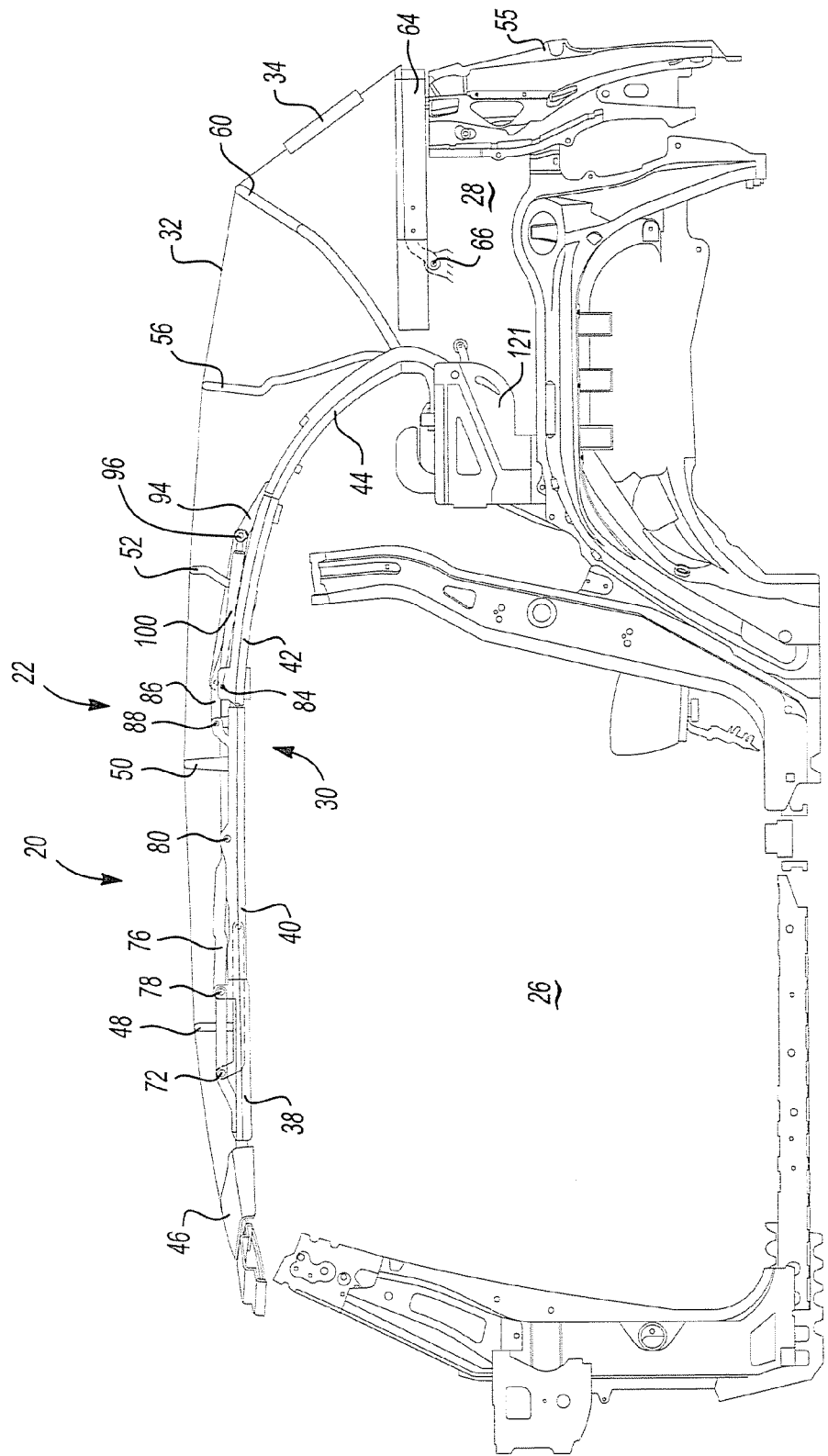
FIG. 2 is a fragmented side view of the convertible roof of FIG. 1 with a first embodiment of a top stack mechanism according to the present teachings in the fully-raised and operative position.
Figure 3:
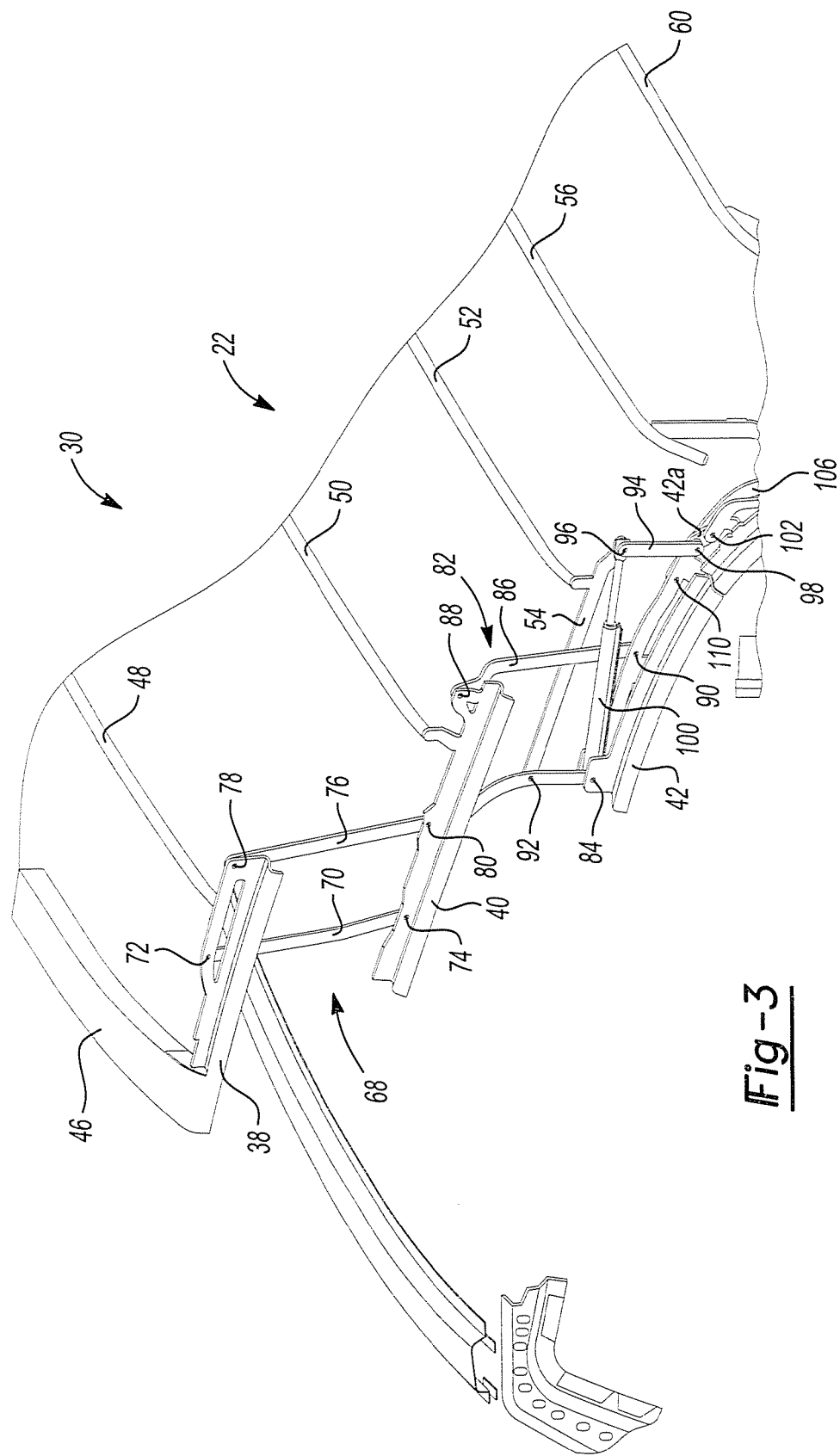
FIG. 3 is a fragmented perspective view of the convertible roof of FIG. 2 during a first phase of the retraction process.
Figure 4:
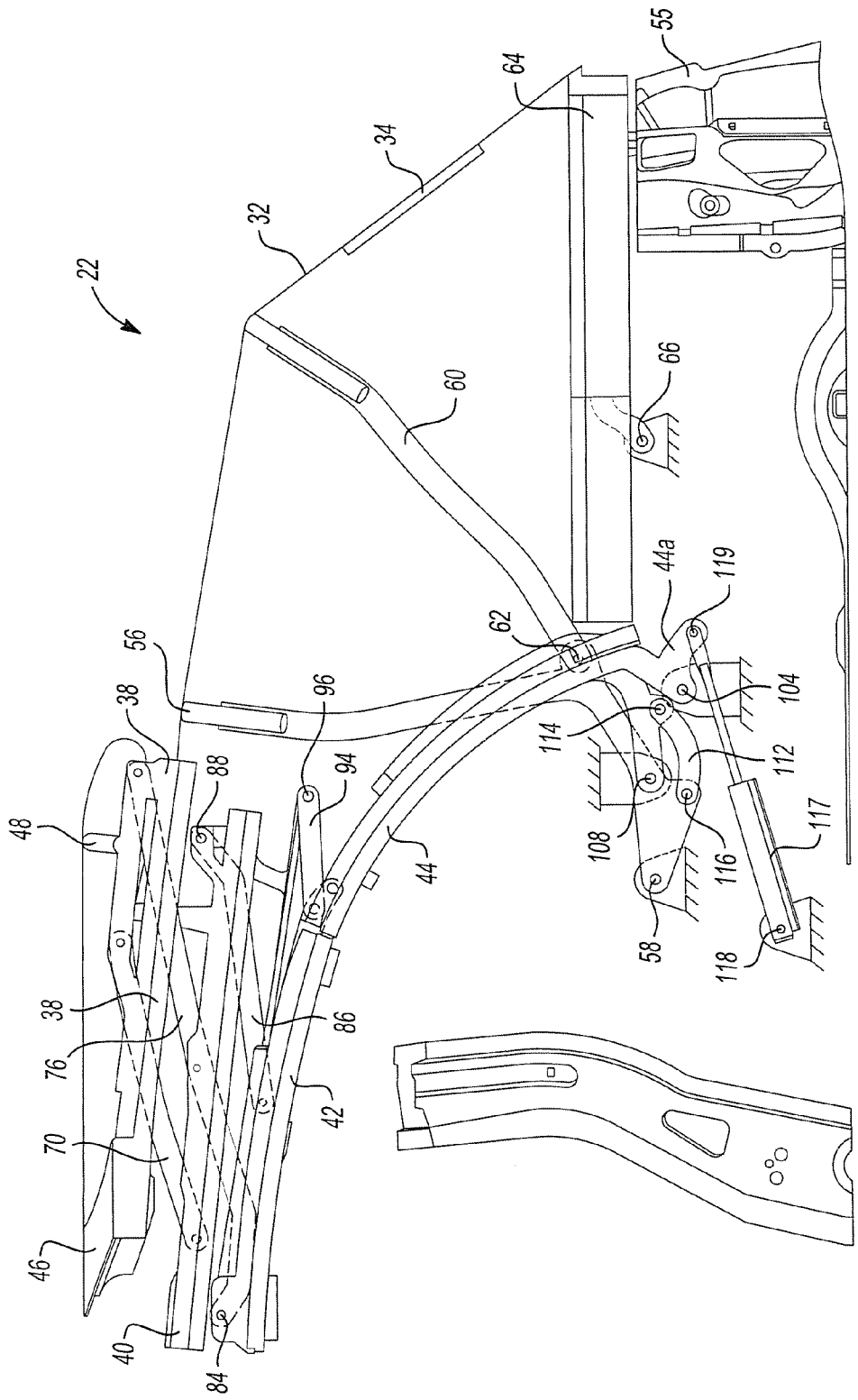
FIG. 4 is a fragmented side view of the convertible roof of FIG. 2 with the first phase of the retraction process completed.
Figure 5:
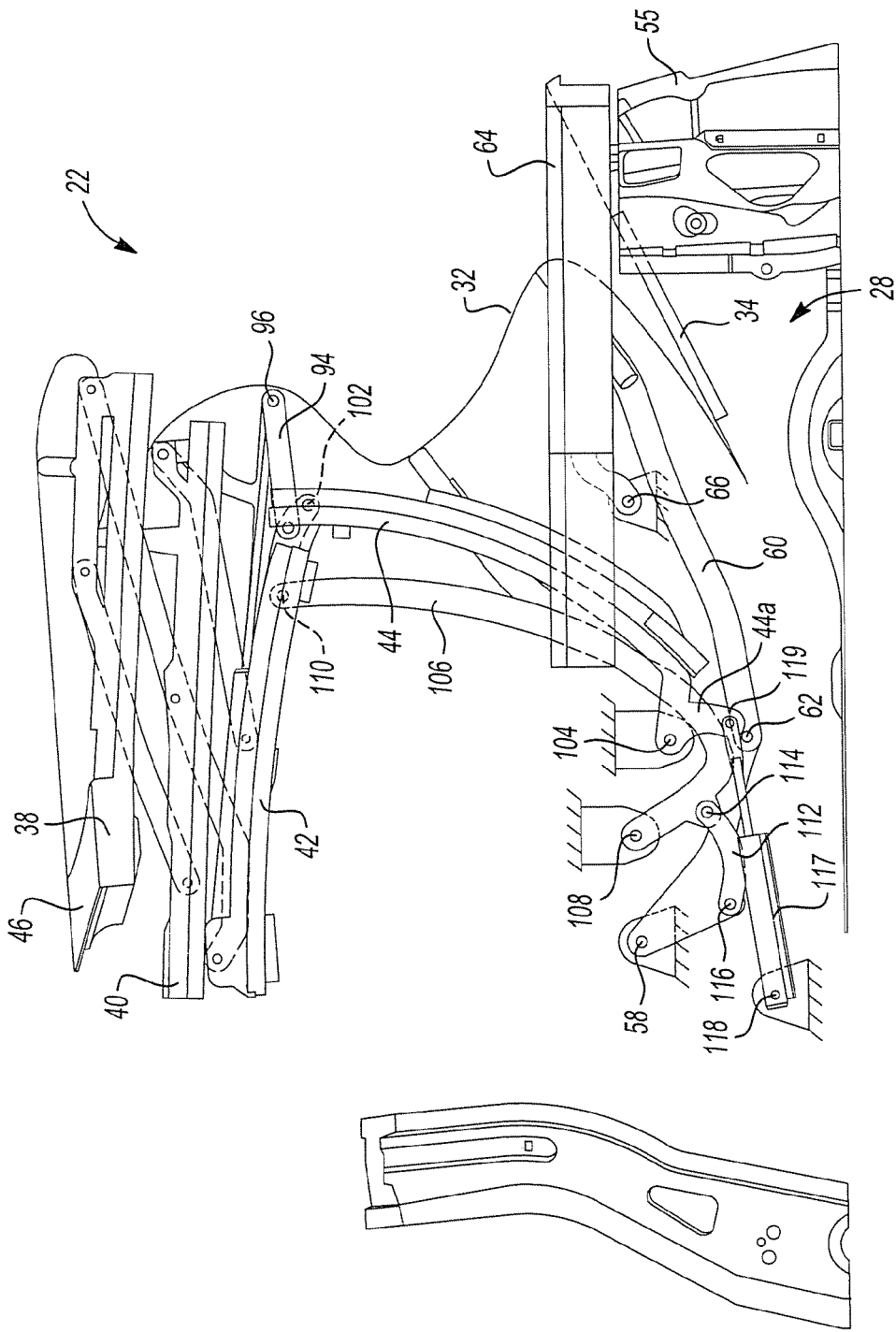
FIG. 5 is a fragmented side view of the convertible roof of FIG. 2 during the second phase of the retraction process.
Figure 6:
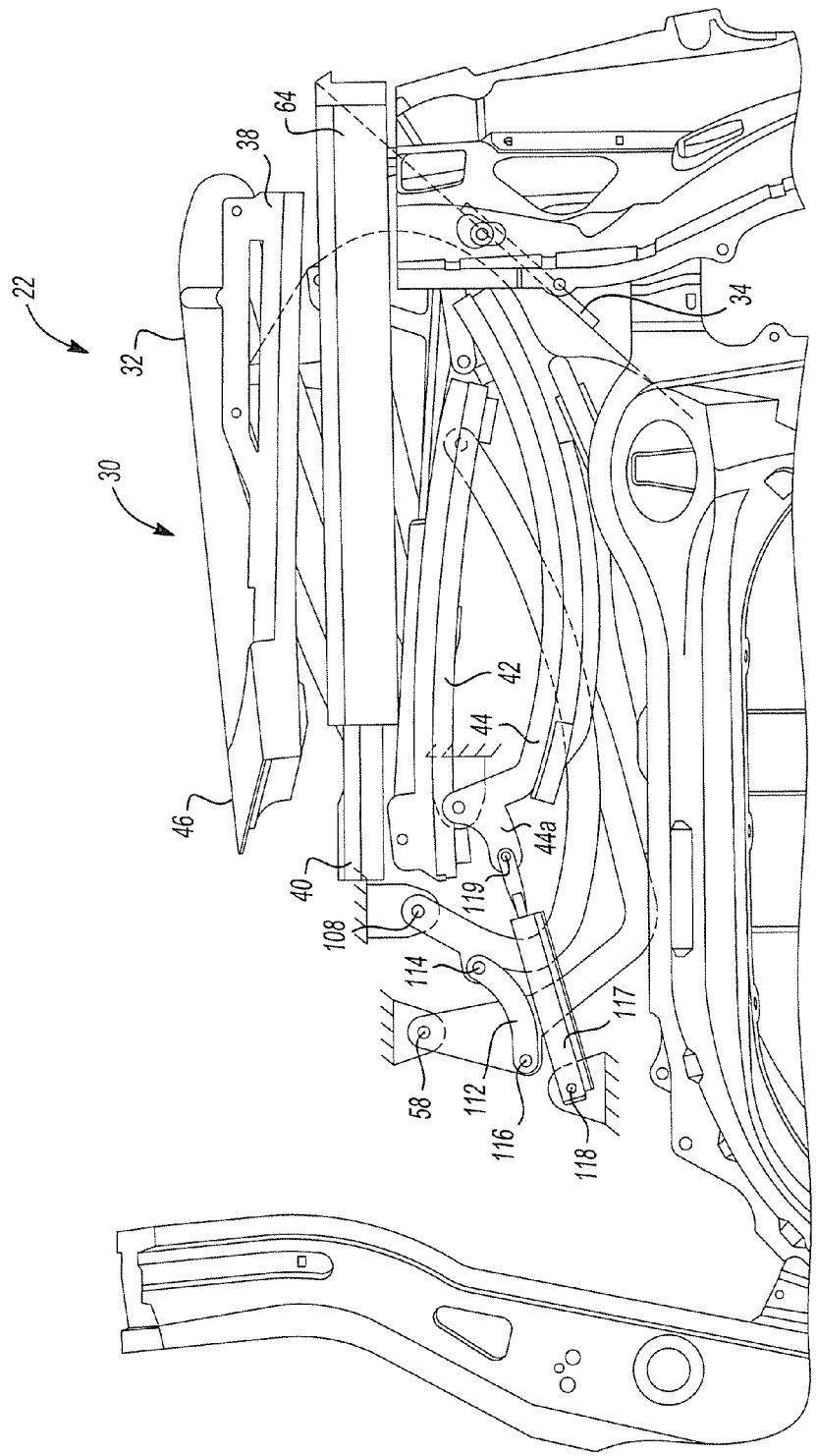
FIG. 6 is a fragmented side view of the convertible roof of FIG. 2 with the second phase of the retraction process completed and the convertible roof in the fully stowed position.
Figure 7:
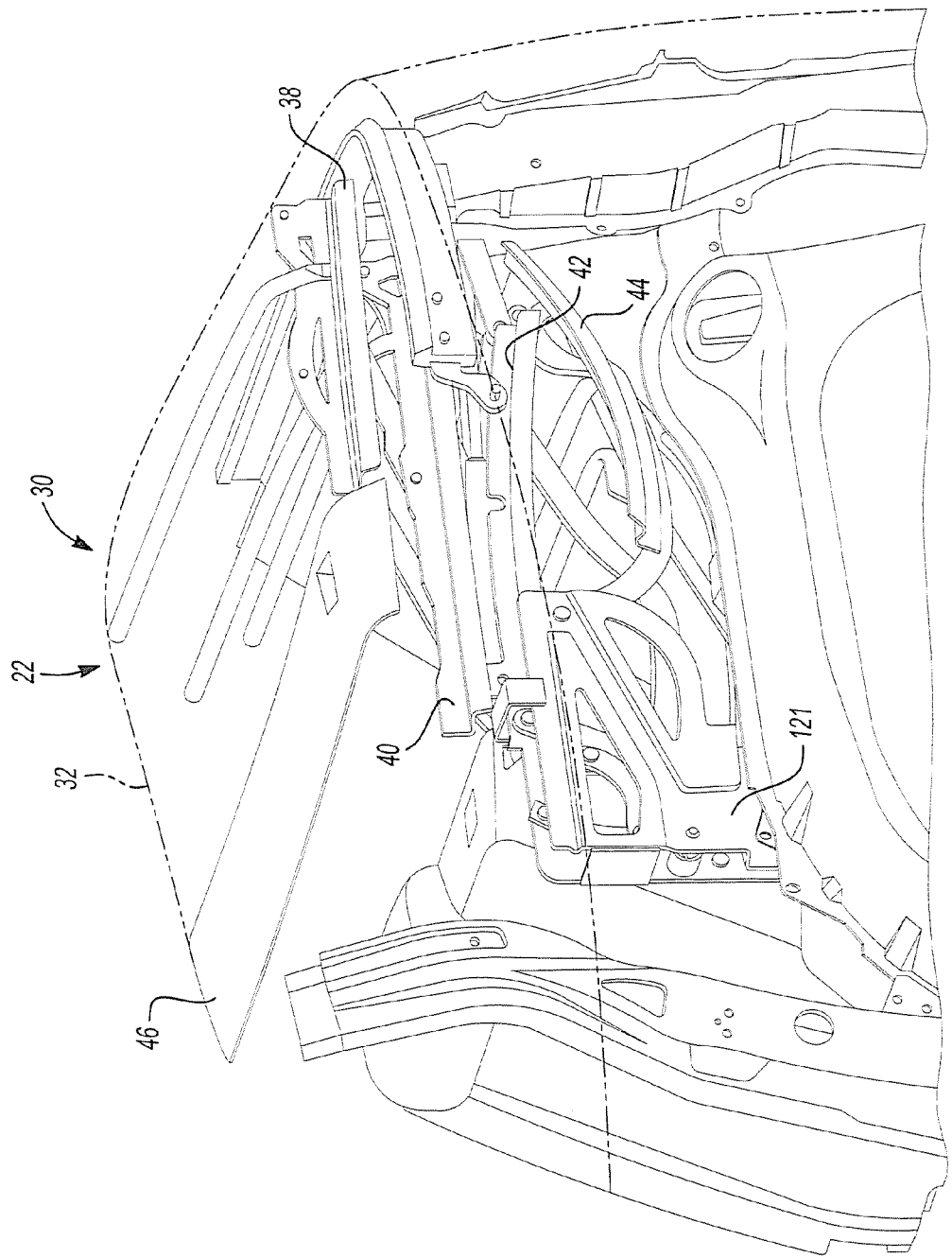
FIG. 7 is a fragmented perspective view of the convertible roof of FIG. 6.

Convertible roof system 22 is of the type utilizing a folding or top stack mechanism 30 and a roof cover 32 and is operable between a fully raised and operative position, as shown in FIGS. 1 and 2, through intermediate positions, such as those shown in FIGS. 3-5, to a fully stowed position, as shown in FIGS. 6-7. Roof cover 32 can be made from a pliable material, such as vinyl, canvas, or a polyester fabric, by way of non-limiting example. If desired, roof cover 32 can include a hard or rigid portion that, optionally, can be covered by the same material that comprises the soft portion of the cover to give a uniform appearance. A backlite 34 is attached to roof cover 32 and is not directly coupled to top stack mechanism 30. For example, reference should be made to U.S. Pat. No. 5,887,936, entitled "Backlite System for Use in an Automotive Vehicle Convertible Roof," by Cowsert, and U.S. Pat. No. 6,102,467, entitled "Backlite Retention System for Use in an Automotive Vehicle Convertible Roof," by Laurain et al., both of which are herein incorporated by reference. Backlite 34 can be made of either a rigid material, such as glass, or a pliable transparent material, such as vinyl.

Top stack mechanism 30 includes a pair of front roof rails 38, front center roof rails 40, rear center roof rails 42, and rear roof rails 44. A forwardmost or number one roof bow 46 is attached to front roof rails 38 and extends transversely across vehicle 20 adjacent a front header above the front windshield. A number two roof bow 48 is coupled to a rear portion of front roof rails 38 and extends transversely across vehicle 20. Optionally, first and second roof bows 46, 48 can be a single integral piece that extends along front roof rails 38. A third roof bow 50 is attached to front center roof rails 40 and extends transversely across vehicle 20. A fourth roof bow 52 is attached to upper drive links 54 and extends transversely across vehicle 20. A fifth roof bow 56 is pivotally coupled to opposite sides of vehicle 20 at fixed pivot 58 and extends transversely across vehicle 20. A sixth roof bow 60 is pivotally coupled to fifth roof bow 56 at pivot 62 and extends transversely across vehicle 20. A rearmost or seventh roof bow 64 is pivotally coupled to opposing sides of vehicle 20 at fixed pivot 66 and extends transversely across vehicle 20.

As best seen in FIGS. 3, 8, and 9, front roof rail 38 is pivotally coupled to front center roof rail 40 by a four-bar linkage assembly 68. Linkage assembly 68 includes a front link 70 having one end pivotally coupled to an intermediate portion of front roof rail 38 at pivot 72 and an opposite end pivotally coupled to a front portion of front center roof rail 40 at pivot 74. One end of a common link 76 is pivotally coupled to a rear portion of front roof rail 38 at pivot 78 while an intermediate portion of common link 76 is pivotally coupled to an intermediate portion of front center roof rail 40 at pivot 80. Linkage assembly 68 includes front roof rail 38, front link 70, front center roof rail 40, and common link 76 and is defined by pivots 72, 74, 80, 78.

Front center roof rail 40 is coupled to rear center roof rail 42 by a second four-bar linkage assembly 82. Linkage assembly 82 includes common link 76 having one end pivotally coupled to a front portion of rear center roof rail 42 at pivot 84 and an intermediate portion pivotally coupled to front center roof rail 40 at pivot 80. One end of a rear link 86 is pivotally coupled to a rear portion of front center roof rail 40 at pivot 88, while the other end is pivotally coupled to an intermediate portion of rear center roof rail 42 at pivot 90. Linkage assembly 82 includes front center roof rail 40, common link 76, rear center roof rail 42, and rear link 86 and is defined by pivots 80, 84, 90, 88.

Linkage assemblies 68, 82 enable front roof rail 38 and front center roof rail 40 to move relative to rear center roof rail 42 during the movement of convertible roof 22 between the fully raised and operative position and the stowed position. To drive this motion, one end of upper drive link 54 is pivotally coupled to an intermediate portion of common link 76 at pivot 92 between pivots 80, 84. The other end of upper drive link 54 is pivotally coupled to one end of upper drive crank 94 at pivot 96. The other end of upper drive crank 94 is pivotally coupled to a rear extension 42a of rear center roof rail 42 at pivot 98. Rotation of upper drive crank 94 about pivot 98 can drive fore-and-aft movement of upper drive link 54. Movement of upper drive link 54, in turn, drives rotation of common link 76 about pivot 84. Because common link 76 forms part of both linkage assemblies 68, 82, movement of common link 76 drives movement of linkage assemblies 68, 82. Therefore, rotation of upper drive crank 94 about pivot 98 can drive movement of front roof rail 38 and front center roof rail 40 relative to rear center roof rail 42 to move between the fully raised and operative position, as shown in FIGS. 1 and 2, through intermediate positions, such as that shown in FIG. 3, to a retracted position, as shown in FIG. 4. This movement of front and front center roof rails 38, 40 can occur while rear center roof rail 42 and rear roof rail 44 remain stationary in their fully raised and operative position. Accordingly, the movement of convertible roof 22 can be a two-phase process wherein the first phase corresponds to movement of front and front center roof rails 38, 40 from a first fully operative and raised position, through intermediate positions, such as the one shown in FIG. 3, to a second retracted position, as shown in FIG. 4.

Figure 10:
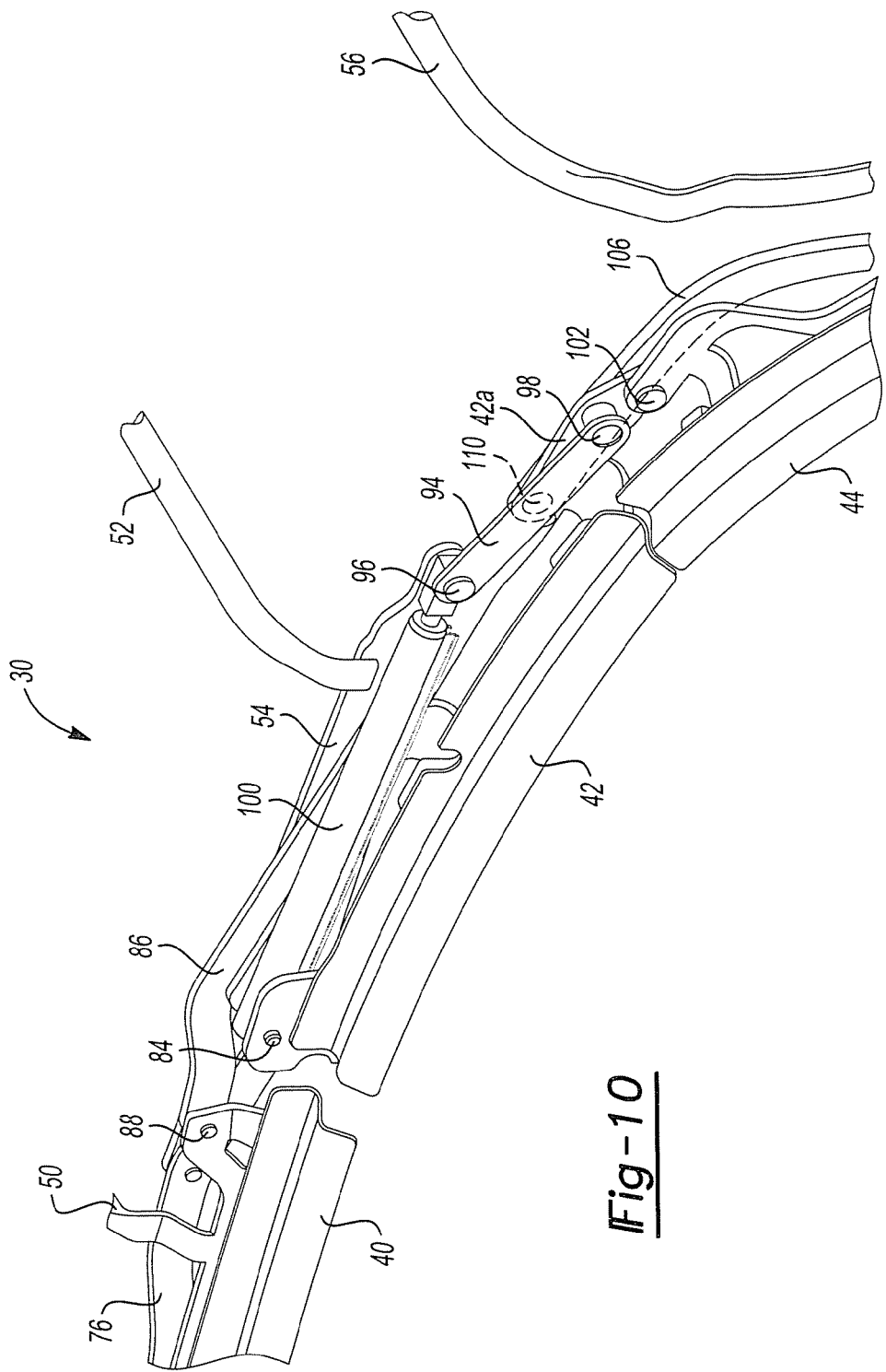
Figure 11:
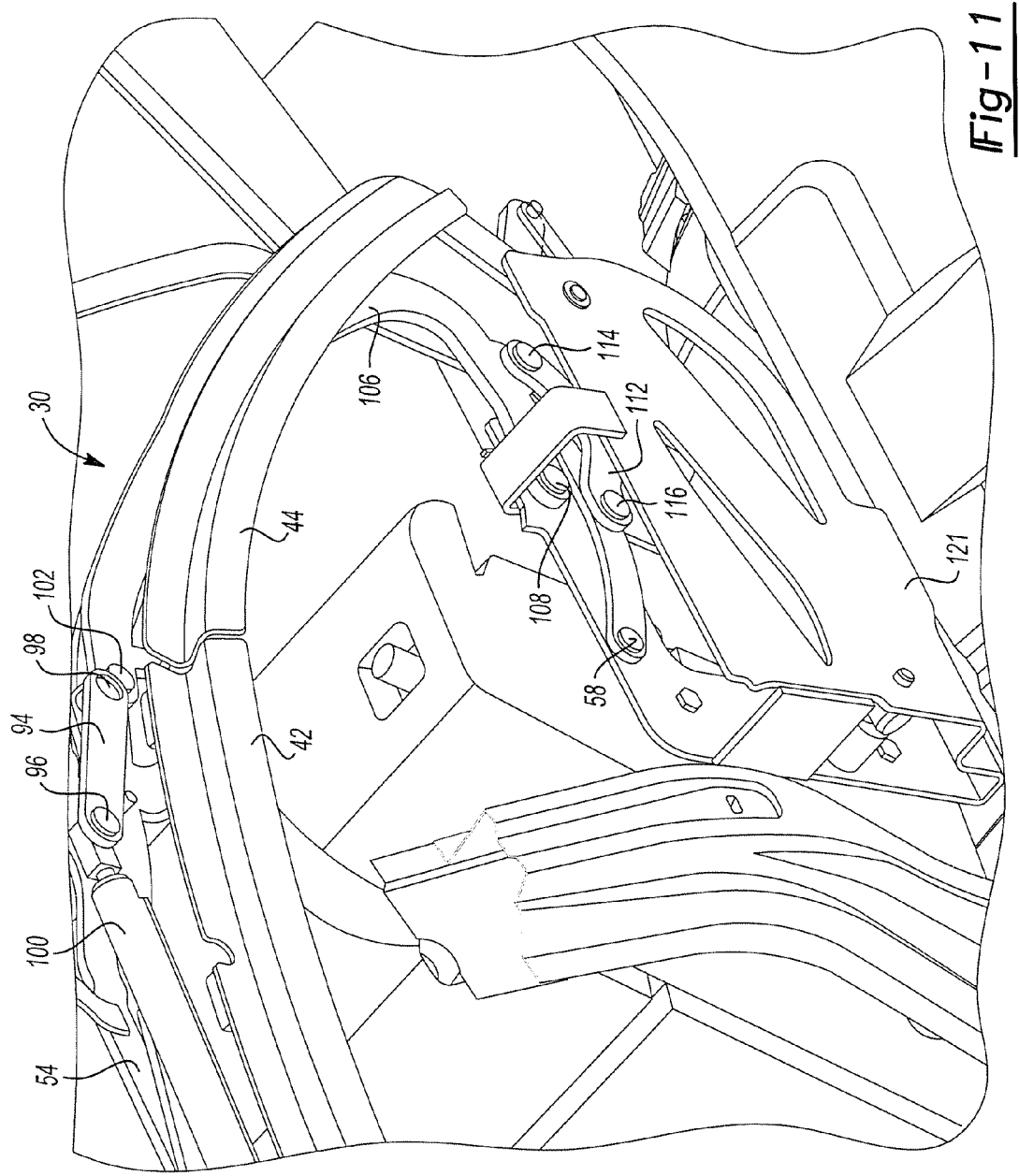
FIG. 11 is a fragmented perspective view of the attachment of the top stack mechanism of FIG. 2 to the vehicle with a bracket.

Actuators can be utilized to drive the first phase of the movement of convertible roof 22. For example, as shown in FIGS. 2, 3, and 10, one end of an actuator 100 can be pivotally coupled to a front portion of rear center roof rail 42 at pivot 84, while the other end is pivotally coupled to upper drive link 54 and upper drive crank 94 at pivot 96. Extension and retraction of actuator 100 can drive movement of upper drive crank 94 about pivot 98 and thereby drive the first phase of the movement of convertible roof 22. Actuator 100 can take a variety of forms. For example, as shown, actuator 100 can be a fluidic actuator that expands and contracts in response to fluid flow. For example, actuator 100 can be a hydraulic actuator, a pneumatic actuator, or the like, by way of non-limiting example.

During the first phase of movement of the convertible roof 22, a double-Z arrangement is achieved, as shown in FIG. 3. Thus, convertible roof 22 utilizes a double-Z top stack mechanism 30. As best seen in FIG. 3, the first Z is formed by front roof rail 38, either one of front link 70 or common link 76, and front center roof rail 40. The second Z is formed by front center roof rail 40, either one of common link 76 or rear link 86, and rear center roof rail 42. This double-Z arrangement allows the first phase of the movement to be achieved while rear center roof rail 42 and rear roof rail 44 remain stationary.

A front portion of rear roof rail 44 is pivotally coupled to the end of rear extension 42a of rear center roof rail 42 at pivot 102 rearward of pivot 98. The other end of rear roof rail 44 is pivotally coupled to vehicle 20 at fixed pivot 104. Movement of rear roof rail 44 is thereby constrained to rotation about pivot 104. One end of a balance link 106 is pivotally coupled to vehicle 20 at fixed pivot 108 while the other end of balance link 106 is pivotally coupled to a front portion of rear extension 42a of rear center roof rail 42 at pivot 110. One end of a coupler 112 is pivotally coupled to the end portion of balance link 106 at pivot 114 near pivot 108. The other end of coupler 112 is pivotally coupled to the end of fifth roof bow 56 at pivot 116 near pivot 58. With this arrangement, rotation of rear roof rail 44 about fixed pivot 104 can drive the second phase of the movement of convertible roof 22 from the second position, shown in FIG. 4, through intermediate positions, such as the one as shown in FIG. 5, to the fully retracted and stowed position, shown in FIGS. 6 and 7. The rotation of rear roof rail 44 causes rotation of balance link 106 which thereby coordinates the rotation of rear center roof rail 42 relative to rear roof rail 44. The movement of rear center roof rail 42 and rear roof rail 44 corresponds to the second phase of the movement of convertible roof 22 between the fully raised and operative position and the stowed position. During the second phase, front roof rail 38 and front center roof rail 40 can remain in their second retracted position and stationary relative to rear center roof rail 42.

An actuator can be used to drive rotation of rear roof rail 44 about fixed pivot 104 to drive the second phase of movement. For example, one end of an actuator 117 can be pivotally coupled to vehicle 20 at fixed pivot 118 while an opposite end of actuator 117 is pivotally coupled to an extension 44a of rear roof rail 44 at pivot 119. Extension and retraction actuator 117 can thereby drive rotation of rear roof rail 44 about pivot 104 and drive the second phase of movement. Actuator 117 can take a variety of forms. For example, as shown, actuator 117 can be a fluidic actuator that extends and retracts in response to fluid flow. For example, actuator 117 can be a hydraulic actuator, a pneumatic actuator, and the like, by way of non-limiting example.

A bracket 121 can be coupled to vehicle 20 and can form the fixed pivots utilized by top stack mechanism 30. Example of a suitable bracket 121 is shown in FIGS. 2, 7 and 11-12. If desired, bracket 121 can also be configured to include fixed pivot 66 and/or be divided into multiple discrete brackets for the various fixed pivots utilized in top stack mechanism 30.

After undergoing the second phase of movement during the retraction process, convertible roof 22 is in the fully retracted and stowed position, as shown in FIGS. 6 and 7. In the fully stowed position, the exterior surface of roof cover 32 that extends between first and second roof bows 46, 48 faces upwardly. In this manner, roof cover 32 can provide a finished and aesthetically pleasing appearance for vehicle 20 when convertible roof 22 is in the fully stowed and retracted position. Additionally, when in the fully stowed and retracted position, backlite 34 is located within storage space 28 beneath sixth roof bow 60. When in the stowed position, the front roof rail 38, front center roof rail 40, and rear center roof rail 42 are substantially horizontally oriented with their respective exteriors facing up while rear roof rail 44 is also substantially horizontally oriented but inverted with its interior surface facing upwardly. When in the stowed position, front roof rail 38 can be substantially flush with a belt line 57 of vehicle 20. The extension process is the opposite of the retraction process.

Figure 12:
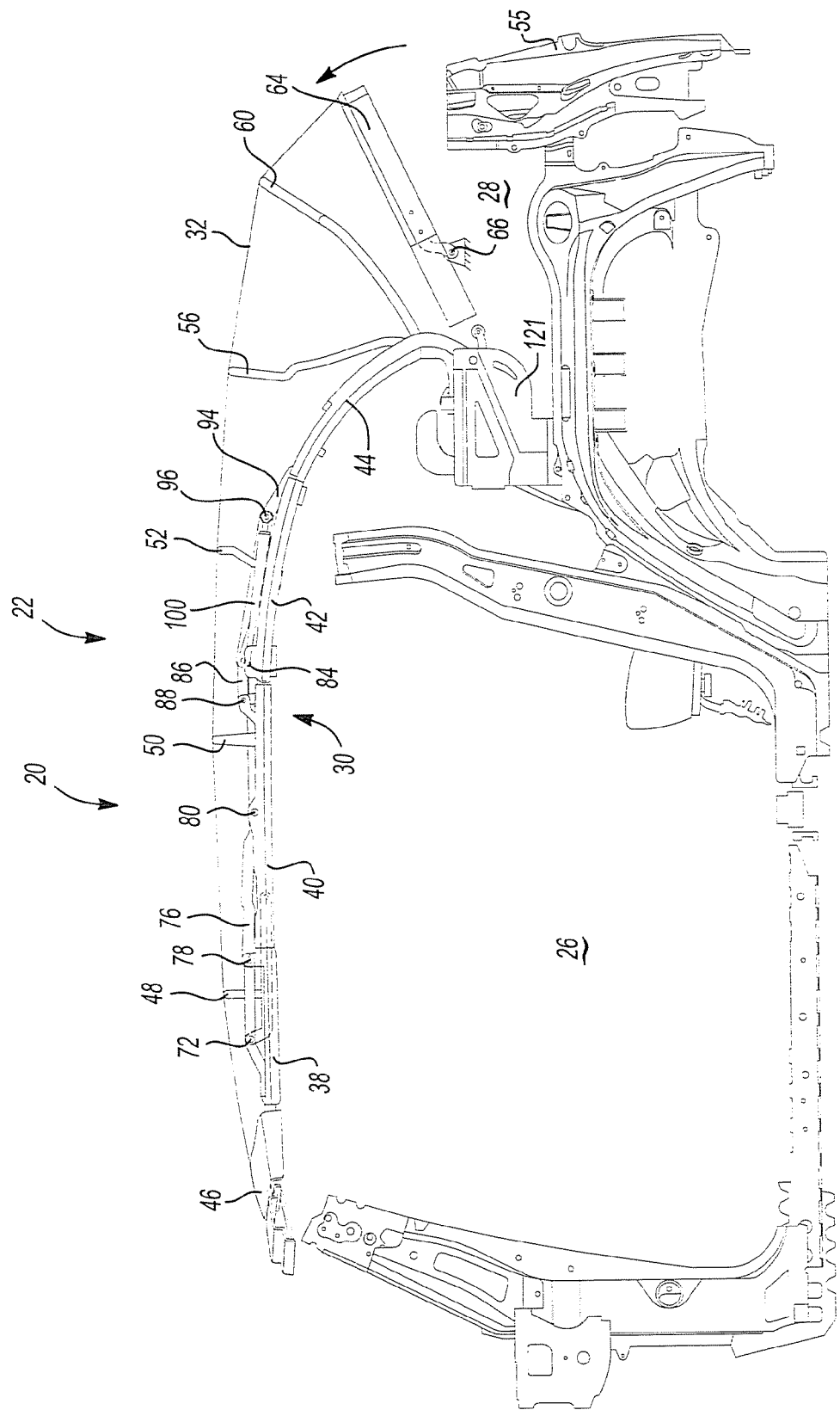
FIG. 12 is a fragmented side view of the convertible roof of FIG. 2 with the rear portion of the convertible roof elevated to allow increased access to the rear stowage area.

Referring now to FIG. 12, the pivotal coupling of rearmost roof bow 64 to vehicle 20 at fixed pivot 66 allows rearmost roof bow 64 to be rotated upwardly. The rotation of rearmost roof bow 64 upwardly can facilitate the opening and closing of rear door 55 of vehicle 20. A latching mechanism, not shown, can be utilized to secure rearmost roof bow 64 to rear door 55 in the closed position, as shown in FIGS. 1 and 2.

Figure 13:
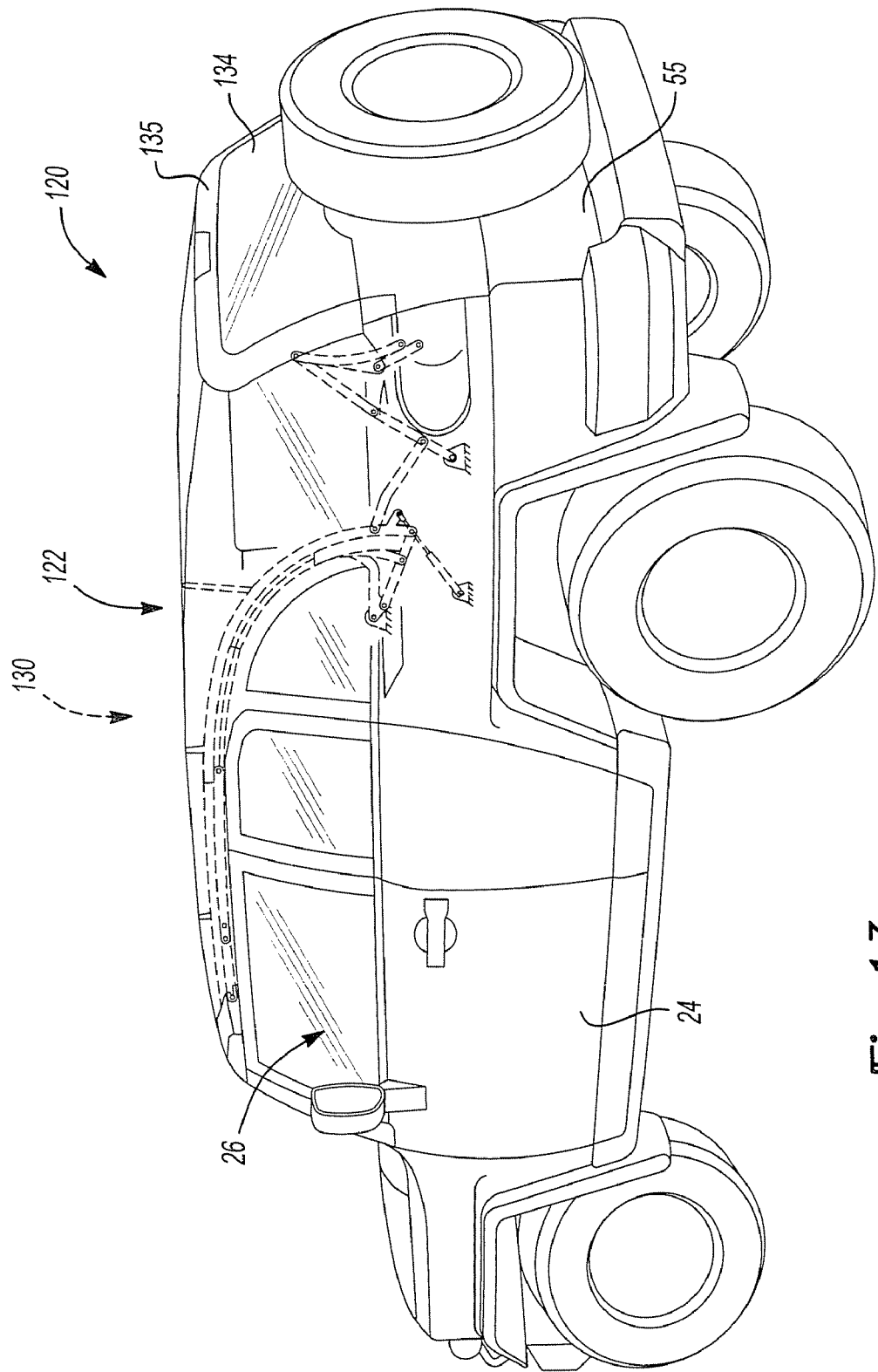
FIG. 13 is a perspective view of an SUV-type vehicle having a convertible roof with a second embodiment of a top stack mechanism according to the present teachings in the fully raised and operative position.
Figure 14:
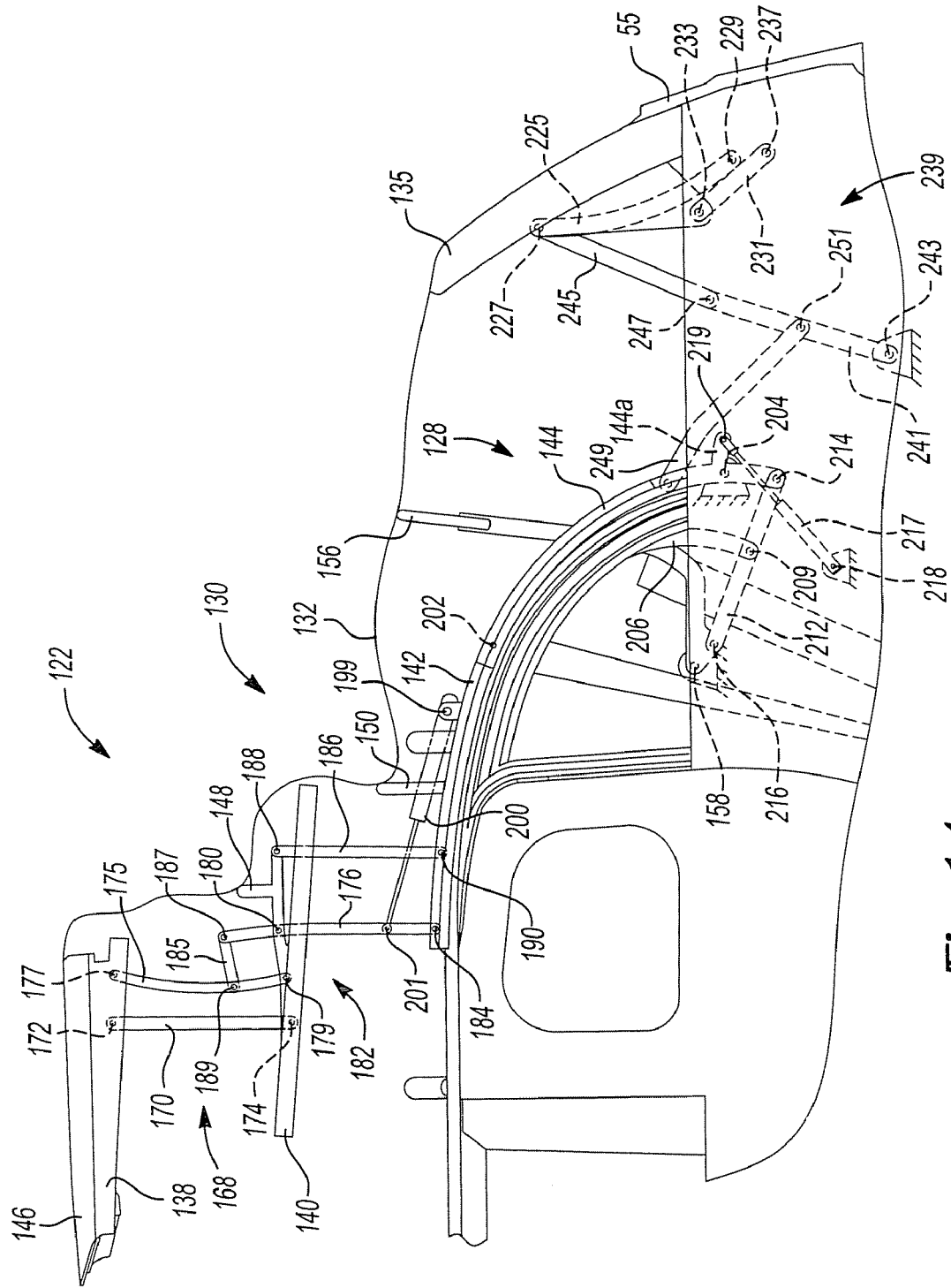
FIG. 14 is a fragmented side view of the convertible roof of FIG. 13 with the top stack mechanism in the first phase of the retraction process.
Figure 15:
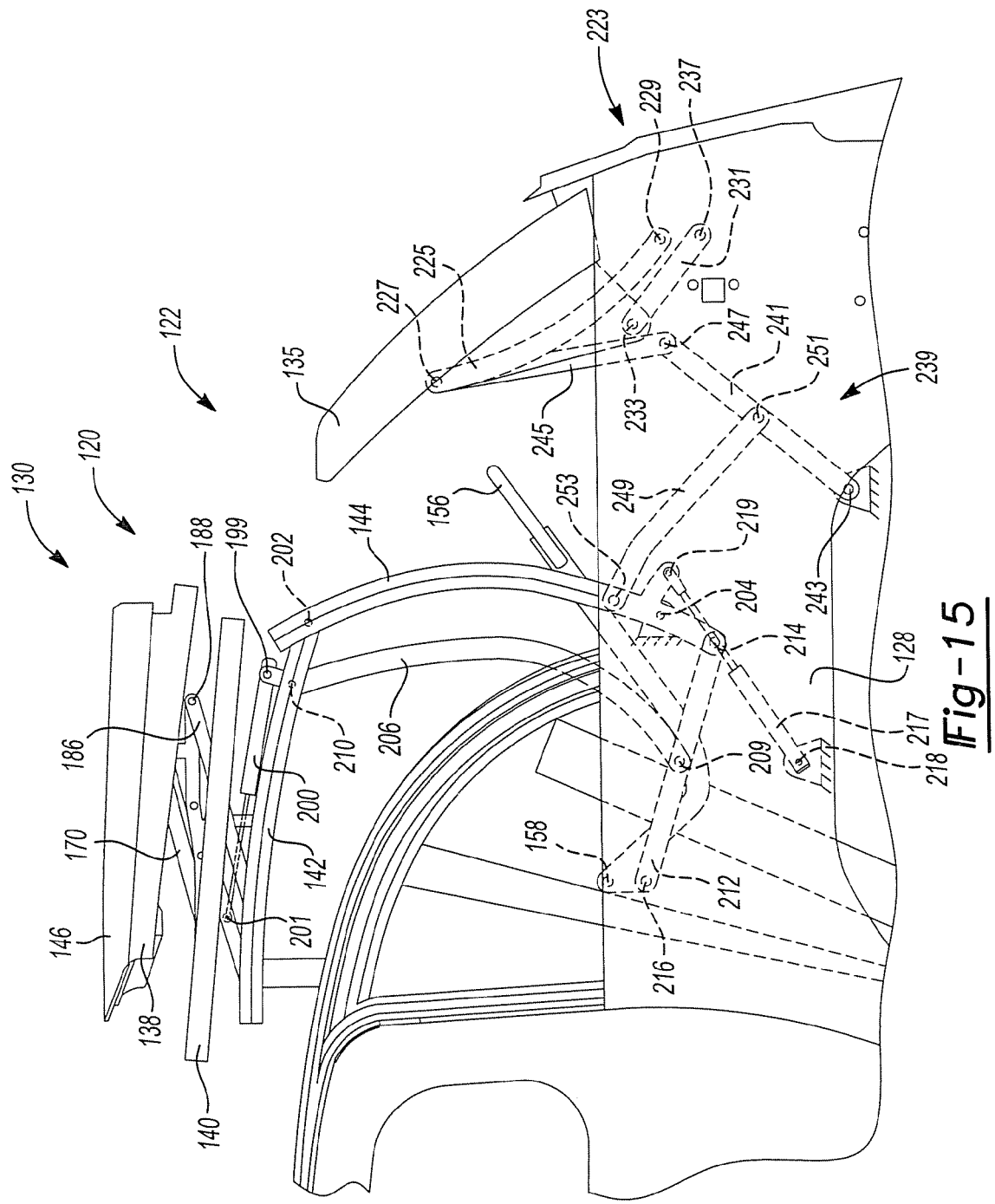
FIG. 15 is a fragmented side view of the convertible roof of FIG. 14 with the top stack mechanism in the second phase of the retraction process and the backlite and frame also retracting into the stowage area.
Figure 16:
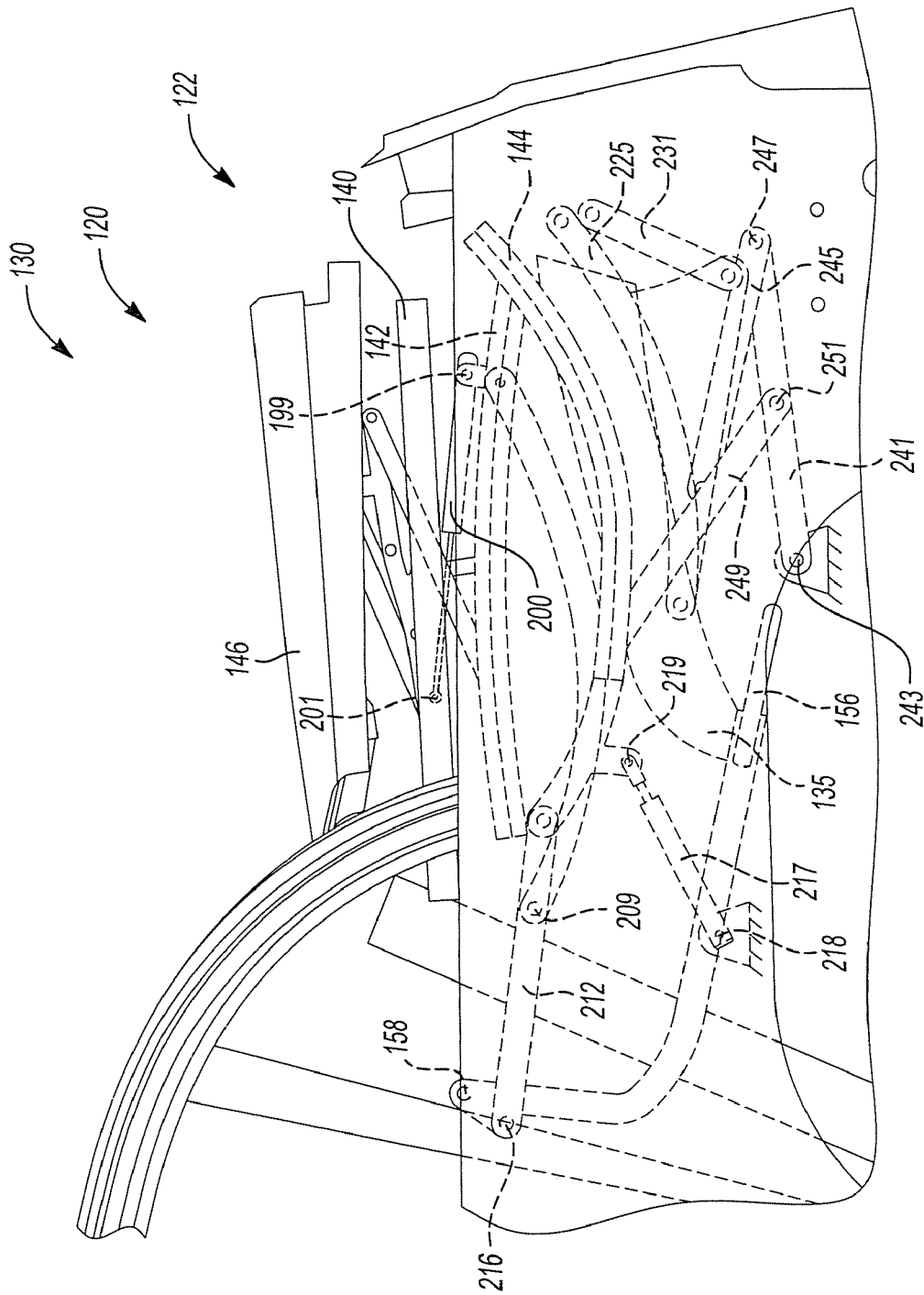
FIG. 16 is a fragmented side view of the convertible roof of FIG. 14 with the top stack mechanism and backlite frame fully retracted and in the stowed position.

Referring now to FIGS. 13-17, a vehicle 120 having a second embodiment of a convertible roof 122 according to present teachings is shown. Again, convertible roof 122 is a type utilizing a folding or top stack mechanism 130 and a roof cover 132 and is operable between a fully raised and operative position, as shown in FIG. 13, through intermediate positions, such as those shown in FIGS. 14 and 15, to a fully stowed position, as shown in FIG. 16. Backlite 134 is disposed within a rigid frame 135 which is pivotally coupled to a rear portion of vehicle 120, as described below.

Top stack mechanism 130 includes a pair of front roof rails 138, front center roof rails 140, rear center roof rails 142, and rear roof rails 144. A forwardmost or number one roof bow 146 is attached to front roof rail 138 and extends transversely across vehicle 120 adjacent a front header above the front windshield. In convertible roof 122, number one roof bow 146 is shown as extending longitudinally along front roof rail 138 a significant distance. It should be appreciated that number one roof bow 146 can be smaller (or larger) than that shown and an additional roof bow installed between the first roof bow and a second roof bow 148. Second roof bow 148 is fixedly coupled to front center roof rail 140 and extends transversely across vehicle 120. A third roof bow 150 is fixedly coupled to an intermediate portion of rear center roof rail 142 and extends transversely across vehicle 120. A fourth roof bow 156 extends transversely across vehicle 120 and is pivotally coupled to vehicle 120 at fixed pivot 158. Frame 135 forms the rearmost roof bow of convertible roof 122.

Front roof rail 138 is coupled to front center roof rail 140 by a four-bar linkage assembly 168. Linkage assembly 168 includes a front link 170 having one end pivotally attached to an intermediate portion of front roof rail 138 at pivot 172, while the other end is pivotally coupled to an intermediate portion of front center roof rail 140 at pivot 174. One end of a rear link 175 is pivotally coupled to a rear portion of front roof rail 138 at pivot 177, while the other end is pivotally coupled to an intermediate portion of rear center roof rail 142 at pivot 179 rearward of pivot 174. Linkage assembly 168 includes front roof rail 138, front link 170, front center roof rail 140, and rear link 175 and is defined by pivots 172, 174, 179, 177. Linkage assembly 168 thereby controls the movement of front roof rail 138 relative to front center roof rail 140.

Front center roof rail 140 is coupled to rear center roof rail 142 with a four-bar linkage assembly 182. Linkage assembly 182 includes a common link 176 that has one end pivotally coupled to a front portion of rear center roof rail 142 at pivot 184, while an intermediate portion of common link 176 is pivotally coupled to front center roof rail 140 at pivot 180. One end of a rear link 186 is pivotally coupled to a rear portion of front center roof rail 140 at pivot 188, while the other end of rear link 186 is pivotally coupled to an intermediate portion of rear center roof rail 142 at pivot 190. Linkage assembly 182 includes front center roof rail 140, common link 176, rear center roof rail 142, and rear link 186 and is defined by pivots 180, 184, 190, 188. Linkage assembly 182 controls the movement of front center roof rail 140 relative to rear center roof rail 142.

Common link 176 interconnects linkage assemblies 168, 182. An end of common link 176 is pivotally coupled to a connector link 185 at pivot 187. The other end of connector link 185 is pivotally coupled to an intermediate portion of rear link 175 at pivot 189. In this manner, common link 176 and connector link 185 can drive movement of linkage assembly 168 due to movement of linkage assembly 182. This interconnection thereby links linkage assemblies 168, 182 such that front and front center roof rails 138, 140 can move between the raised and fully operative position, as shown in FIG. 13, through an intermediate position, such as that shown in FIG. 14, to a second retracted position adjacent rear center roof rail 142, as shown in FIG. 15. This corresponds to the first phase of the movement process of convertible roof 122 and is similar to that described above with reference to convertible roof 22. Again, the first phase of movement of convertible roof 122 can be accomplished while rear center roof rail 142 and rear roof rail 144 remain stationary and in their raised operative position.

Actuators can be utilized to drive the first phase of the movement of convertible roof 122. For example, as shown in FIGS. 14-16, one end of an actuator 200 can be pivotally coupled to a rear portion of rear center roof rail 142 at pivot 199, while the other end is pivotally coupled to common link 176 at pivot 201. Extension and retraction of actuator 200 can drive movement of linkage assembly 182, which thereby also drives linkage assembly 168. Actuator 200 can take a variety of forms. For example, as shown, actuator 200 can be a fluidic actuator that expands and contracts in response to fluid flow. For example, actuator 200 can be a hydraulic actuator, a pneumatic actuator, or the like, by way of non-limiting example. It should be appreciated that actuator 200 can be coupled to drive either common link 176 or rear link 186. Furthermore, it should be appreciated that a crank or other additional linkages can be added to facilitate the driving of linkage assembly 182 with an actuator.

The second phase of movement of convertible roof 122 involves the movement of rear center roof rail 142 and rear roof rail 144 from the raised operative position, as shown in FIGS. 13 and 14, through intermediate positions, such as that shown in FIG. 15, to a fully stowed position, as shown in FIG. 16.

An end portion of rear roof rail 144 is pivotally coupled to a rear portion of rear center roof rail 142 at pivot 202. The other end portion of rear roof rail 144 is pivotally coupled to vehicle 120 at fixed pivot 204. One end of a balance link 206 is pivotally coupled to a rear portion of rear center roof rail 142 at pivot 210 which is forward of pivot 202. The other end of balance link 206 is pivotally coupled to an intermediate portion of a coupler 212 at pivot 209. Coupler 212 interconnects rear roof rail 144 and fourth roof bow 156. One end of coupler 212 is pivotally coupled to rear roof rail 144 at pivot 214, while the other end of coupler 212 is pivotally coupled to fourth roof bow 156 at pivot 216. Coupler 212 thereby interconnects rear roof rail 144, balancing link 206 and fourth roof bow 156. With this interconnection, rotation of rear roof rail 144 about pivot 204 can drive rotation of balance link 206 about pivot 209 and rotation of fourth roof bow 156 about pivot 158.

An actuator can be used to drive rotation of rear rail 144 about fixed pivot 204 to drive the second phase of movement. For example, one end of an actuator 217 can be pivotally coupled to vehicle 20 at fixed pivot 218, while an opposite end of actuator 217 is pivotally coupled to an extension 144a of rear roof rail 144 at pivot 219. Extension and retraction of actuator 217 can thereby drive rotation of rear roof rail 144 about pivot 204 and drive the second phase of movement. Actuator 217 can take a variety of forms. For example, as shown, actuator 217 can be a fluidic actuator that extends and retracts in response to fluid flow. For example, actuator 217 can be a hydraulic actuator, a pneumatic actuator, and the like, by way of non-limiting example.

Convertible roof 122 also utilizes a double-Z arrangement similar to that discussed above with reference to convertible roof 22. As shown in FIG. 14, the first Z is formed by front roof rail 138, either one of front link 170 or rear link 175, and front center roof rail 140. The second Z is formed by front center roof rail 140, either one of common link 176 or rear link 186, and rear center roof rail 142. This double-Z arrangement allows the first phase of the movement to be achieved while rear center roof rail 142 and rear roof rail 144 remain stationary.

In convertible roof 122, backlite 134 is disposed within frame 135. Frame 135 is coupled to vehicle 120 with a four-bar linkage assembly 223. Linkage assembly 223 includes a first link 225 having one end pivotally coupled to frame 135 at pivot 227, while the other end is pivotally coupled to vehicle 120 at fixed pivot 229. One end of a second link 231 is pivotally coupled to frame 135 at pivot 233, while the other end is pivotally coupled to vehicle 120 at fixed pivot 237. Linkage assembly 223 is formed by frame 135, first link 225, vehicle 120, and second link 231 and is defined by pivots 227, 229, 237, 233. Linkage assembly 223 controls the movement of frame 135 relative to vehicle 120.

Linkage assembly 223 is coupled to rear roof rail 144 with a buggy link assembly 239. Buggy link assembly 239 includes a first buggy link 241 having one end coupled to vehicle 120 at fixed pivot 243, while the other end is pivotally coupled to a second buggy link 245 at pivot 247. The other end of second buggy link 245 is pivotally coupled to frame 135 at pivot 227. One end of a third buggy link 249 is pivotally coupled to an intermediate portion of first buggy link 241 at pivot 251, while the other end of third buggy link 249 is pivotally coupled to rear roof rail 144 at pivot 253. Third link 249 thereby interconnects buggy link assembly 239 with rear roof rail 144.

When rear roof rail 144 is in the raised and operative position, as shown in FIG. 14, first and second buggy links 241, 245 are in an over-center position and lock frame 135 in the raised and operative position. As rear roof rail 144 rotates rearwardly, third buggy link 249 causes first buggy link 241 to rotate about pivot 243 and move to an under-center position and thereby cause frame 135 to rotate forwardly and into storage space 128. Thus, during the second phase of movement of convertible roof 122, the rotation of rear roof rail 144 drives rotation of frame 135. The linkage assemblies are configured and arranged such that frame 135 resides between fourth roof bow 156 and rear roof rail 144 when in the stowed position, as shown in FIG. 16. The rest of the storage of convertible roof 122 is similar to that discussed above with reference to convertible roof 22.

In convertible roof 122, the movement is a two-phase process, similar to that described above with reference to convertible roof 22. During the first phase, front and front center roof rails 138, 140 move from a fully raised and operative position, as shown in FIG. 13, through intermediate positions, such as that shown in FIG. 14, to a retracted position adjacent and above rear center roof rail 142. During this first phase of movement, rear center roof rail 142 and rear roof rail 144 can remain stationary and in their raised and stowed positions, as shown in FIG. 14. Once the first phase is completed, the second phase of movement can occur. In the second phase, rear roof rail 144 rotates about fixed pivot 204, which in turn drives movement of rear center roof rail 142. Simultaneous with the movement of rear roof rail 144, frame 135 also begins to rotate into storage area 128. When the second phase is complete, convertible roof 122 is in the fully stowed position, as shown in FIG. 16.

In the fully stowed position, front roof rail 138, front center roof rail 140, and rear center roof rail 142 are substantially horizontally disposed with their exterior surfaces facing up, while rear roof rail 144 is substantially horizontally disposed with its interior surface facing upwardly. First roof bow 146 can form an aesthetically pleasing appearance for vehicle 120 and cover convertible roof 122 when in the stowed position. The extension process is the opposite of the retraction process.

Figure 17:
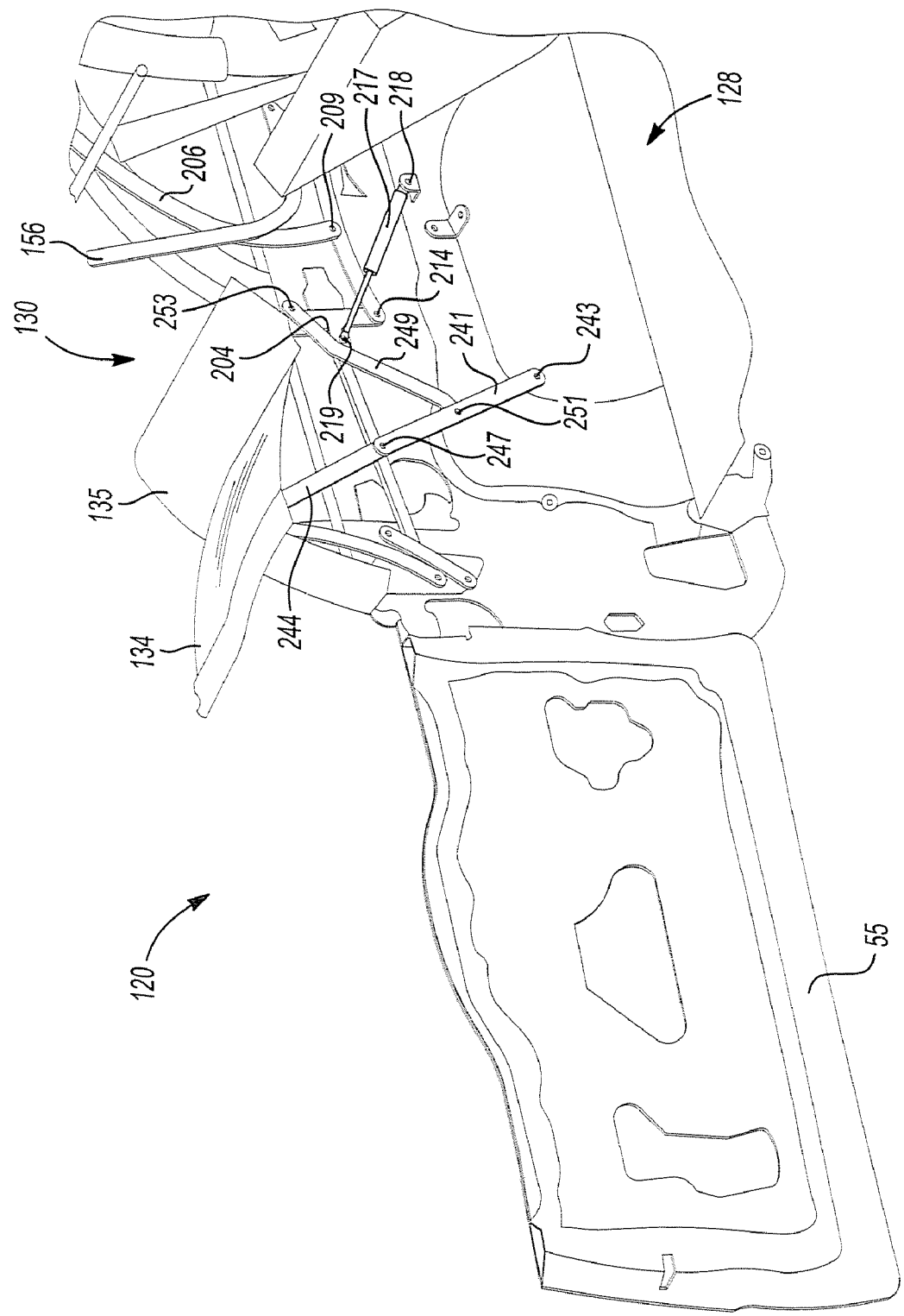
FIG. 17 is a fragmented perspective view of the stowage area of the vehicle of FIG. 13 illustrating the opening of the backlite.

Referring now to FIG. 17, backlite 134 is pivotally coupled to frame 135 such that backlite 134 can move from a substantially vertical position, as shown in FIG. 14, to a raised position, as shown in FIG. 17. In the raised position, access to storage area 128 is provided.

Thus, in the convertible roofs according to the present teachings, the movement is a two-step process. Actuators can be disposed in the rear center roof rails to drive the first phase of the process. The disposing of the actuators in the rear center roof rails can reduce the load placed on the actuators and thereby allow the use of smaller actuators. During the first phase, the rear center and rear roof rails can remain stationary. During the second phase of the process, the front and front center roof rails can remain stationary relative to the rear center roof rail. Actuators in the rear of the vehicle can be used to drive the second phase of the process. The backlite can be passively moved between a raised and stowed position, as done in convertible roof 22, or can be actively driven between the raised and stowed positions, as done in convertible roof 122. The use of a buggy link assembly to drive movement of the backlite can advantageously facilitate locking of the backlite in the raised and operative position. Additionally, the buggy link assembly can facilitate coordination of the movement of the backlite into the stowed position, thereby preventing adverse mishaps and possible crashing into the backlite with components of the convertible roof system.

It should be appreciated that, while the convertible roofs disclosed herein are shown with reference to specific examples and configurations, variations in the convertible roofs shown can be employed without departing from the spirit and scope of the present teachings. For example, it should be appreciated that the linkage assemblies and the links used herein can be configured in different arrangements and different shapes to provide a desired retraction packaging of the convertible roofs. Additionally, the location and number of the pivots can also vary to provide a desired packaging and motion of the convertible roofs. Furthermore, the various features and capabilities shown in the convertible roofs herein can be interchanged with one another to achieve a desired operation. It should also be appreciated that while the actuators for the first phase of movement are shown and described as being attached to rear center roof rails, the actuators can be disposed in other locations and/or on other roof rails. Further, while the convertible roofs are shown as having four roof rails, the convertible roofs can have more or less roof rails depending upon the needs of the vehicle and the convertible roofs to be placed thereon.

Moreover, while linear actuators are shown, it should be appreciated that rotary actuators and/or electric actuators may also be employed to drive the motion of the linkages and the convertible roofs shown. Furthermore, it should be appreciated that the actuators can be controlled by an electronic control unit. Additionally, devices such as limit switches, sensors, and/or potentiometers can be coupled to the body of the vehicle, any obstruction-detecting devices, other features of the vehicle, and the convertible roof to inform the control unit of the position of these components and their various linkages to ensure that the various components do not interfere with one another and that the convertible roof and its associated actuators are properly controlled to move between the raised and stowed positions. An example of a suitable control system for the convertible roof, the vehicle, and the various components thereon is that disclosed in U.S. Pat. No. 6,288,511 entitled, "Automotive Convertible Top System," issued to Porter et al., the disclosure of which is incorporated by reference herein.

Furthermore, it should be appreciated that while the convertible roofs herein are shown as being automatically actuated, the present teachings can be utilized with manually operated convertible roofs. Additionally, while the convertible roofs shown herein are soft-top convertible roofs with a pliable cover, it should be appreciated that one or more panels may be employed as part of the convertible roof, although all of the benefits of the present teachings may not be realized. For example, reference should be made to U.S. Pat. No. 5,429,409, entitled, "Convertible Top," which is incorporated by reference herein. Thus, one skilled in the art will readily recognize from such teachings and from the accompanying drawings and claims that various changes, modifications, and variations can be made therein without departing from the spirit and scope of the present teachings.

What is claimed is:

1. An automotive vehicle convertible roof comprising a cover and a top stack mechanism operable between a raised position and a stowed position, said top stack mechanism including a double-Z folding configuration, said top stack mechanism further including:
   a plurality of roof rails, said plurality of roof rails including a first roof rail, a second roof rail and a third roof rail on each outboard side of said top stack mechanism, said first roof rail being a rearmost one of said roof rails;
   at least one transversely extending roof bow; and
   at least one actuator attached to said second roof rail and operable to drive movement of said third roof rail relative to said second roof rail.

2. The convertible roof of claim 1, wherein said third roof rail is a forward most one of said roof rails, and said cover is a pliable fabric supported by said roof bow.

3. The convertible roof of claim 1, wherein said at least one actuator drives all movement of said third roof rail relative to said second roof rail.

4. The convertible roof of claim 1, wherein said plurality of roof rails includes a fourth roof rail, said fourth roof rail is a forward most one of said roof rails, and said at least one actuator drives movement of said third and fourth roof rails relative to said second roof rail.

5. The convertible roof of claim 4, wherein said at least one actuator drives all movement of said fourth and third roof rails relative to said second roof rail.

6. The convertible roof of claim 1, wherein said at least one actuator is at least two actuators, a first one of said actuators is attached to said second roof rail and drives movement of said third roof rail relative to said second roof rail, and a second one of said actuators is coupled to said rearmost roof rail and drives movement of said rearmost roof rail.

7. The convertible roof of claim 1, wherein movement of said rearmost roof rail is independent of said at least one actuator.

8. The convertible roof of claim 1, wherein said at least one actuator is directly attached to said second roof rail.

9. The convertible roof of claim 1, further comprising a linkage assembly coupling said second and third roof rails together and wherein said at least one actuator drives movement of said linkage assembly.

10. An automotive vehicle convertible roof comprising a cover and a top stack mechanism operable between a raised position and a stowed position, said top stack mechanism including:
    a plurality of roof rails coupled together, said roof rails including a first roof rail, a second roof rail, and a third roof rail on each outboard side of said top stack mechanism; and
    at least one transversely extending roof bow,
    wherein on each outboard side of said top stack mechanism, said first, second and third roof rails each have an exteriorly facing surface that faces upwardly when said top stack mechanism is in both said raised and stowed positions.

11. The convertible roof of claim 10, wherein said first, second and third roof rails are coupled to one another and form a double-Z shape during movement between the raised and stowed positions.

12. The convertible roof of claim 10, wherein said first roof rail is coupled to said second roof rail with a first at least four-bar linkage assembly and said second roof rail is coupled to said third roof rail with a second at least four-bar linkage assembly.

13. The convertible roof of claim 10, further comprising a fourth roof rail and wherein said fourth roof rail is a rearmost roof rail, and said fourth roof rail has an exteriorly facing surface that faces upwardly when said top stack mechanism is in said raised position and faces downwardly when said top stack mechanism is in said stowed position.

14. The convertible roof of claim 13, further comprising a backlite and wherein a portion of said backlite is disposed below said fourth roof rail when said top stack mechanism is in said stowed position.

15. An automotive vehicle convertible roof comprising a cover and a top stack mechanism operable between a raised and stowed position, said top stack mechanism including:
    a plurality of roof rails including a first roof rail, a second roof rail, and a third roof rail;
    at least one transversely extending roof bow; and
    a connecting link pivotally connected to each of said first, second and third roof rails with respective first, second and third pivots,
    wherein movement of each of said first, second and third roof rails relative to said connecting link is limited to movement about said first, second and third pivots, respectively.

16. The convertible roof of claim 15, wherein said first and second roof rails are coupled together by said connecting link and a second link and said second and third roof rails are coupled together by said connecting link and a third link.

17. The convertible roof of claim 15, wherein said first and second roof rails are coupled together with a first at least four-bar linkage assembly and said second and third roof rails are coupled together with a second at least four-bar linkage assembly, and said connecting link forms one of the links in both of the first and second at least four-bar linkage assemblies.

18. The convertible roof of claim 15, further comprising a fourth roof rail and said fourth roof rail is a rearmost one of said roof rails.

19. A method of operating an automotive vehicle convertible roof having a top stack mechanism operable between raised and stowed positions in a two phase movement, the top stack mechanism having at least three roof rails and at least one transversely extending roof bow, the method comprising:
    moving the top stack mechanism from a first raised position to a second retracted position during a first phase of movement; and
    moving the top stack mechanism from the second retracted position to a third stowed position in a stowage area of the vehicle during a second phase of movement,
    wherein the first phase of movement includes:
    moving second and third ones of the at least three roof rails relative to one another from the first raised position to the second retracted position; and
    maintaining a first one of the at least three roof rails stationary during movement of the second and third roof rails from the first raised position to the second retracted position.

20. The method of claim 19, wherein moving the second and third roof rails includes moving the second and third roof rails to a position wherein the second and third roof rails are disposed one above the other when in the second retracted position.

21. The method of claim 20, wherein moving the second and third roof rails includes moving a forwardmost one of the second and third roof rails to a position above the other one of the second and third roof rails when in the second retracted position.

22. The method of claim 19, wherein the second phase of movement includes:
  moving the first, second and third roof rails from the second retracted position to the third stowed position; and
  maintaining the third roof rail stationary relative to the second roof rail during movement from the second retracted position to the third stowed position.

23. The method of claim 19, wherein maintaining the first roof rail stationary includes maintaining a rearmost one of the roof rails stationary.

24. The method of claim 19, wherein the top stack mechanism includes a fourth roof rail and the first phase includes:
  moving a forwardmost two of the roof rails relative to one another from the first raised position to the second retracted position; and
  maintaining a rearmost two of the roof rails stationary during movement of the second and third roof rails from the first raised position to the second retracted position.

25. The method of claim 24, wherein the second phase of movement includes:
  moving the first, second, third and fourth roof rails from the second retracted position to the third stowed position; and
  maintaining the forwardmost two roof rails stationary relative to one of the rearmost two roof rails during movement from the second retracted position to the third stowed position.

26. The method of claim 25, wherein the first and fourth roof rails are the rearmost two roof rails, the fourth roof rail is the rearmost roof rail and the second phase of movement includes maintaining the forwardmost two roof rails stationary relative to the third roof rail during movement from the second retracted position to the third stowed position.

27. The method of claim 26, wherein the first phase of movement includes moving the forwardmost two roof rails relative to one another from the first raised position to the second retracted position with a first actuator coupled to the third roof rail and the second phase of movement includes moving the first, second, third and fourth roof rails from the second retracted position to the third stowed position with a second actuator coupled to the fourth roof rail and the vehicle.

28. The method of claim 19, wherein the first phase of movement includes moving the second and third roof rails relative to one another from the first raised position to the second retracted position with a first actuator attached solely to the top stack mechanism and the second phase of movement includes moving the first, second, and third roof rails from the second retracted position to the third stowed position with a second actuator coupled to both the first roof rail and the vehicle.

29. The convertible roof of claim 1, wherein each outboard side of said top stack mechanism further comprises a first four-bar linkage mechanism and a second four-bar linkage mechanism.

30. The convertible roof of claim 15, wherein said top stack mechanism folds in a double-Z manner.

31. The method of claim 19, further comprising folding the top stack mechanism in a double-Z manner.

32. The method of claim 19, further comprising preventing the second and third roof rails from inverting when moved between the raised and stowed positions.

33. The method of claim 19, further comprising folding a first four-bar linkage assembly and a second four-bar linkage assembly on each outboard side of the top stack mechanism.

* * * * *